(12) United States Patent
Grason et al.

(10) Patent No.: US 8,561,153 B2
(45) Date of Patent: *Oct. 15, 2013

(54) WEB-BASED COLLABORATIVE FRAMEWORK

(71) Applicant: AT&T Intellectual Property I, L.P., Atlanta, GA (US)

(72) Inventors: Thomas Grason, Lawrenceville, GA (US); Scott Downes, Doraville, GA (US); Mark Podojil, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/775,986

(22) Filed: Feb. 25, 2013

(65) Prior Publication Data

US 2013/0174229 A1   Jul. 4, 2013

Related U.S. Application Data

(63) Continuation of application No. 11/465,481, filed on Aug. 18, 2006, now Pat. No. 8,392,962.

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |

(52) U.S. Cl.
USPC ............... 726/4; 726/5; 715/234; 715/738; 715/741; 717/101

(58) Field of Classification Search
USPC ............ 726/2, 4–10; 715/234–236, 738–739, 715/741–743; 717/101, 110–113
See application file for complete search history.

(56) References Cited

U.S. PATENT DOCUMENTS

| | | | |
|---|---|---|---|
| 6,189,029 B1 * | 2/2001 | Fuerst | 709/217 |
| 6,230,185 B1 * | 5/2001 | Salas et al. | 709/205 |
| 6,279,007 B1 | 8/2001 | Uppala | |
| 6,701,343 B1 | 3/2004 | Kenyon | |
| 6,732,332 B1 | 5/2004 | Borysewicz et al. | |
| 7,149,959 B1 | 12/2006 | Jones et al. | |
| 7,346,840 B1 | 3/2008 | Ravishankar et al. | |
| 7,555,713 B2 * | 6/2009 | Yang | 715/248 |
| 7,600,188 B2 | 10/2009 | Good et al. | |
| 7,668,913 B1 | 2/2010 | Underwood et al. | |
| 2001/0029527 A1 | 10/2001 | Goshen | |

(Continued)

OTHER PUBLICATIONS

U.S. Office Action dated Aug. 28, 2009 in U.S. Appl. No. 11/465,481.

(Continued)

*Primary Examiner* — Jeffrey Pwu
*Assistant Examiner* — Jayesh Jhaveri
(74) *Attorney, Agent, or Firm* — Hartman & Citrin LLC

(57) ABSTRACT

Embodiments of the present disclosure provide systems and methods for facilitating network communications. Briefly described, one embodiment of the system, among others, includes a server-based application configured to produce web pages for a web site in accordance with input received from a user; and an interface to the server-based application receiving selections of features which are available to be added to the web site in response to user prompts and to set access rights on which features are to be available to different roles of users. Other systems and methods are also provided.

20 Claims, 34 Drawing Sheets

(56) References Cited

U.S. PATENT DOCUMENTS

| | | | |
|---|---|---|---|
| 2002/0129106 A1* | 9/2002 | Gutfreund | 709/205 |
| 2004/0196307 A1 | 10/2004 | Zak et al. | |
| 2005/0021629 A1* | 1/2005 | Cannata et al. | 709/205 |
| 2006/0282304 A1 | 12/2006 | Bedard et al. | |
| 2007/0061487 A1 | 3/2007 | Moore et al. | |
| 2007/0156809 A1 | 7/2007 | Dickinson et al. | |
| 2007/0283273 A1* | 12/2007 | Woods | 715/738 |
| 2009/0083704 A1* | 3/2009 | Floyd et al. | 717/110 |

OTHER PUBLICATIONS

U.S. Office Action dated Feb. 19, 2010 in U.S. Appl. No. 11/465,481.
U.S. Office Action dated Jun. 25, 2012 in U.S. Appl. No. 11/465,481.
U.S. Notice of Allowance dated Oct. 15, 2012 in U.S. Appl. No. 11/465,481.
"HTML Forms: Radio Button." Accessed via the Internet Archive Aug. 18, 2009. 3 pages.

* cited by examiner

FIG. 28

WEB-BASED COLLABORATIVE FRAMEWORK

CROSS-REFERENCE TO RELATED APPLICATIONS

The present application is a continuation of U.S. patent application Ser. No. 11/465,481, now U.S. Pat. No. 8,392,962, filed Aug. 18, 2006, and entitled "Web-Based Collaborative Framework," which is hereby incorporated herein by reference in its entirety.

TECHNICAL FIELD

The present disclosure is generally related to network communications and, more particularly, is related to facilitation of network communications.

BACKGROUND

Within a business enterprise or corporation, organizations and projects often have team members that are geographically dispersed. To facilitate communication amongst members in order to manage documents, collaborate, communicate to people across different states, across departments, etc., web-based communication tools are available but they are generally cumbersome and require a high level of technical skills to manage and maintain. Another option for facilitating communications is to utilize shared network folders and directories within a network file system, but individual members often struggle to map shared folders to a local drive on a client machine.

With regard to the World Wide Web, although it has become a highly integrated resource for information sharing, many people are limited in capabilities due to their lack of web development/programming skills. For example, a user may be in charge of operating a web site where the user does not have his or her own development team for the web site. This user may also not have the technical knowledge for managing the web site using conventional techniques. A non-technical user may be in charge of architected applications that need to consume network data but does not have the capabilities for managing this task with present tools.

Thus, a heretofore unaddressed need exists in the industry to address the aforementioned deficiencies and inadequacies.

SUMMARY

Embodiments of the present disclosure provide systems and methods for facilitating network communications. Briefly described, one embodiment of the system, among others, includes a server-based application configured to produce web pages for a web site in accordance with input received from a user; and an interface to the server-based application receiving selections of features which are available to be added to the web site in response to user prompts and to set access rights on which features are to be available to different roles of users.

Embodiments of the present disclosure can also be viewed as providing methods for facilitating network communications. In this regard, one embodiment of such a method, among others, can be broadly summarized by the following steps: receiving settings and preferences for producing a web site; receiving access levels assignments for visitors to the web site that determine which functions are enabled when a visitor visits the web site via the web interface; and building the web site in accordance with the settings, preferences, and access levels.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 5-32 are screenshot diagrams of web pages from a workspace site built using the system of FIG. 1.

DETAILED DESCRIPTION

Figure 1:
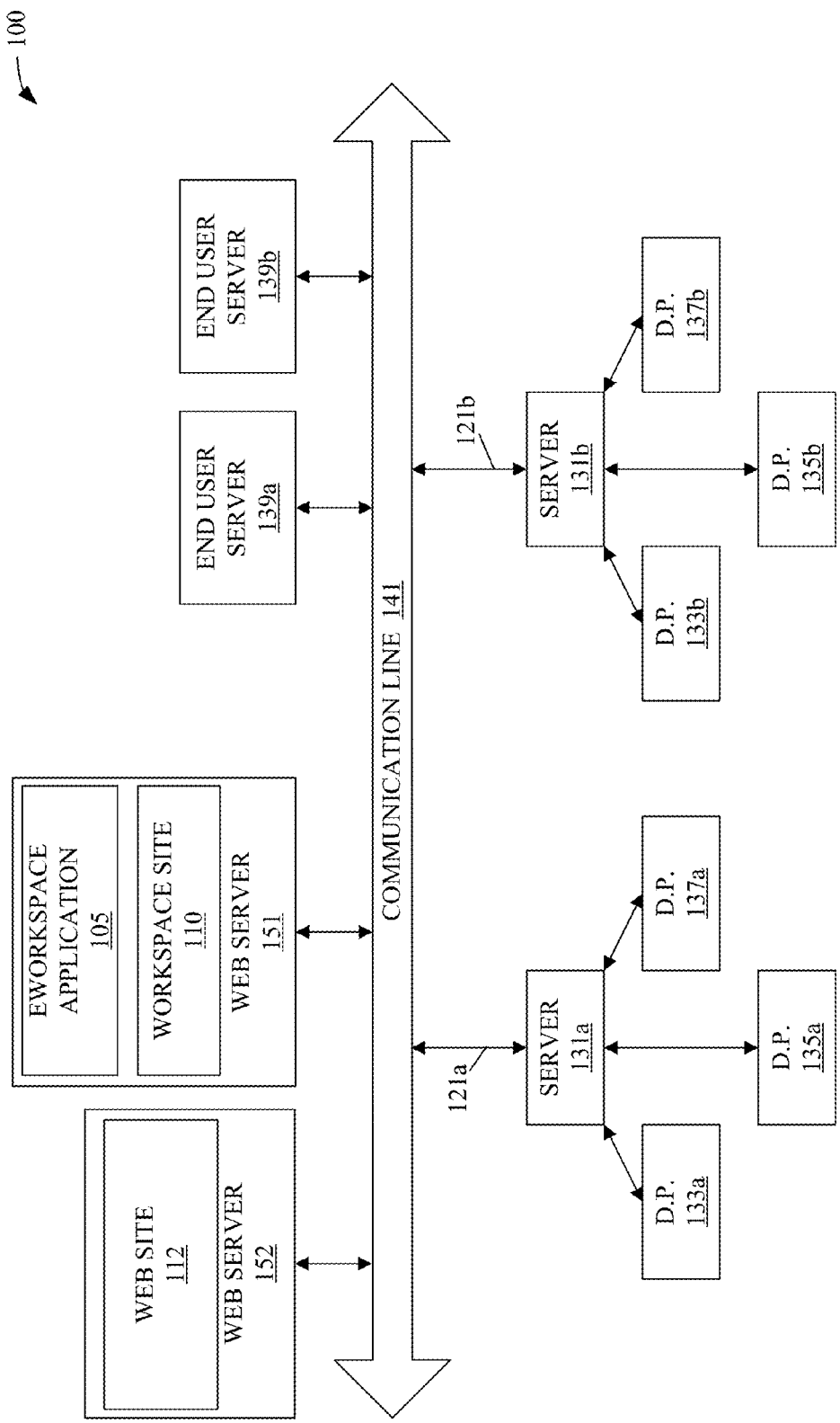
FIG. 1 is a block diagram of an Internet based system upon which one embodiment, among others, of the collaborative workspace system of the present disclosure may be implemented.

Various embodiments of the present disclosure now will be described more fully with reference to the accompanying drawings. Embodiments of the disclosure may include many different forms and should not be construed as limited to the embodiments set forth herein. These embodiments are intended to convey the scope of the disclosure to those skilled in the art. Furthermore, all "examples" given herein are intended to be non-limiting.

Components of a collaborative workspace system of the present disclosure can be implemented in software, firmware, hardware, or a combination thereof. In one embodiment of the disclosure, which is intended to be a non-limiting example, system components are implemented in software that is executed by a computer, for example, but not limited to, a personal computer, mainframe computer, workstation, etc.

An embodiment of the software-based system, which comprises an ordered listing of executable instructions for implementing logical functions, can be embodied in any computer-readable medium for use by, or in connection with, an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus or device. The computer-readable medium can be, for example, but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical).

The collaborative workspace system allows rapid deployment of a web-based project site for an organization or any group, including an enterprise organization. Embodiments of the collaborative workspace system provide a project team or group the ability to easily share information on their project while leveraging the web to allow for universal access. With very little web development skills, administrators of a project web site can quickly customize their site to fit the needs of their project, project team, and leadership stakeholders.

In some embodiments, the collaborative workspace system of the present disclosure is implemented with use of a communication network, such as the Internet—although a private Intranet may also be used. As such, a brief description and explanation of terms associated with the Internet follow. A browser, or "web" browser, allows for simple graphical user interface (GUI) access to network servers, which support documents formatted as so-called web pages. The World Wide Web (WWW), or "web", is a collection of servers on the Internet that utilize a Hypertext Transfer Protocol (HTTP), which is an application protocol that provides users access to files (which can be in different formats such as text, graphics, images, sound, video, etc.) using a Standard Generalized Markup Language (SGML). SGML is an information management standard for providing platform-independent and application-independent documents that retain formatting, indexing, and linking information. SGML provides a grammar-like mechanism for users to define the structure of their documents and the tags they will use to denote the structure in individual documents. The page description language known as Hypertext Markup Language (HTML) is an application of SGML. HTML provides basic document formatting of text and images and allows the developer to specify hyperlinks, or "links," to other servers and files.

Use of an HTML-compliant client, such as a web browser, involves specification of an address via a Uniform Resource Locator (URL). Upon such specification, the client makes a TCP/IP request to the server identified in the URL and receives a "web page" (namely, a document formatted according to HTML) in return.

By way of example and illustration, FIG. 1 illustrates an Internet based system upon which one embodiment, among others, of the collaborative workspace system 100 of the present disclosure may be implemented. It should be noted that while the present disclosure provides implementation of the collaborative workspace 100 within an Internet based system, the collaborative workspace 100 need not be provided via use of the Internet. Instead, one of reasonable skill in the art will appreciate that the collaborative workspace system 100 may be implemented within other mediums, such as, for example, but not limited to, a local area network, or wide area network.

Referring to FIG. 1, a plurality of networks 121a, 121b are shown wherein each network 121a, 121b includes multiple digital processors 133a, 135a, 137a, and 133b, 135b, 137b, respectively. Digital processors 133a, 133b, 135a, 135b, 137a, 137b may include, but are not limited to, personal computers, mini computers, laptops, and the like. Each digital processor 133a, 133b, 135a, 135b, 137a. 137b may be coupled to a host processor or server 131a, 131b for communication among processors 133a, 133b, 135a, 135b, 137a, 137b within the specific corresponding network 121a, 121b.

According to an exemplary embodiment, the host processor or server 131a, 131b is coupled to a communication line 141 that interconnects or links the networks 121a, 121b to each other, thereby forming an Internet. As such, each of the networks 121a, 121b are coupled along the communication line 141 to enable access from a digital processor 133a, 135a, 137a of one network 121a to a digital processor 133b, 135b, 137b of another network 121b. Various end-user servers 139a, 139b, two of which are shown as an example, are linked to the communication line 141, thus providing end-users with access to the Internet.

According to an exemplary embodiment, a workspace web site 110 (and applications provided by the workspace web site 110) may be maintained on a web server 151 that is connected to the Internet for communication among the various networks 121a, 121b and/or digital processors 133a, 133b, 135a, 135b, 137a, 137b and other end-users connected to the Internet via respective end-user servers 139a, 139b. In some embodiments, an "eworkspace" application 105 is maintained on the web server 151 that builds the workspace web site 110 on demand from a user. Other web server(s) 152 also maintain web site(s) 112 and/or applications external to web server 151.

Figure 2:
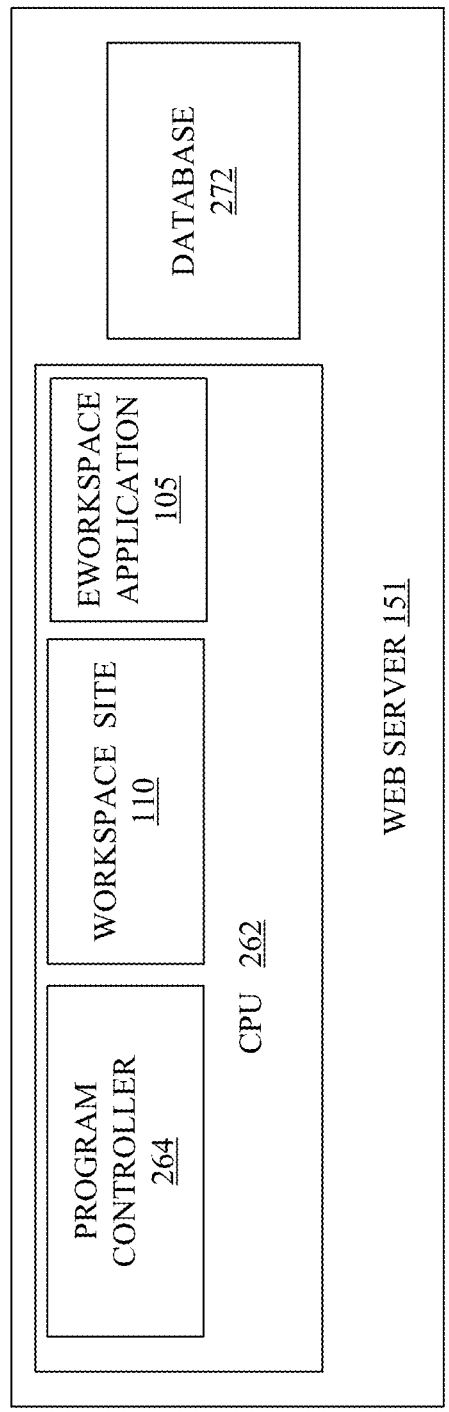
FIG. 2 is a block diagram illustrating a web server utilized in an embodiment of the system of FIG. 1.

FIG. 2 is a block diagram that further illustrates the web server 151 of FIG. 1. As shown by FIG. 2, the web server 151 comprises a central processing unit (CPU) 262 having a program controller 264 and eworkspace application 105 for building a workspace implementing a workspace web site 110. The program controller 264 is capable of performing functionality required by the collaborative workspace system 100, as described in detail hereinbelow. The web server 151 also comprises a web server database 272, which holds data necessary to enable the web server 151 to customize a workspace site 110 in accordance with settings or preferences associated with a particular project team or group. It should be noted that other information may be stored within the web server database 272 in accordance with one exemplary embodiment of the disclosure.

Figure 3:
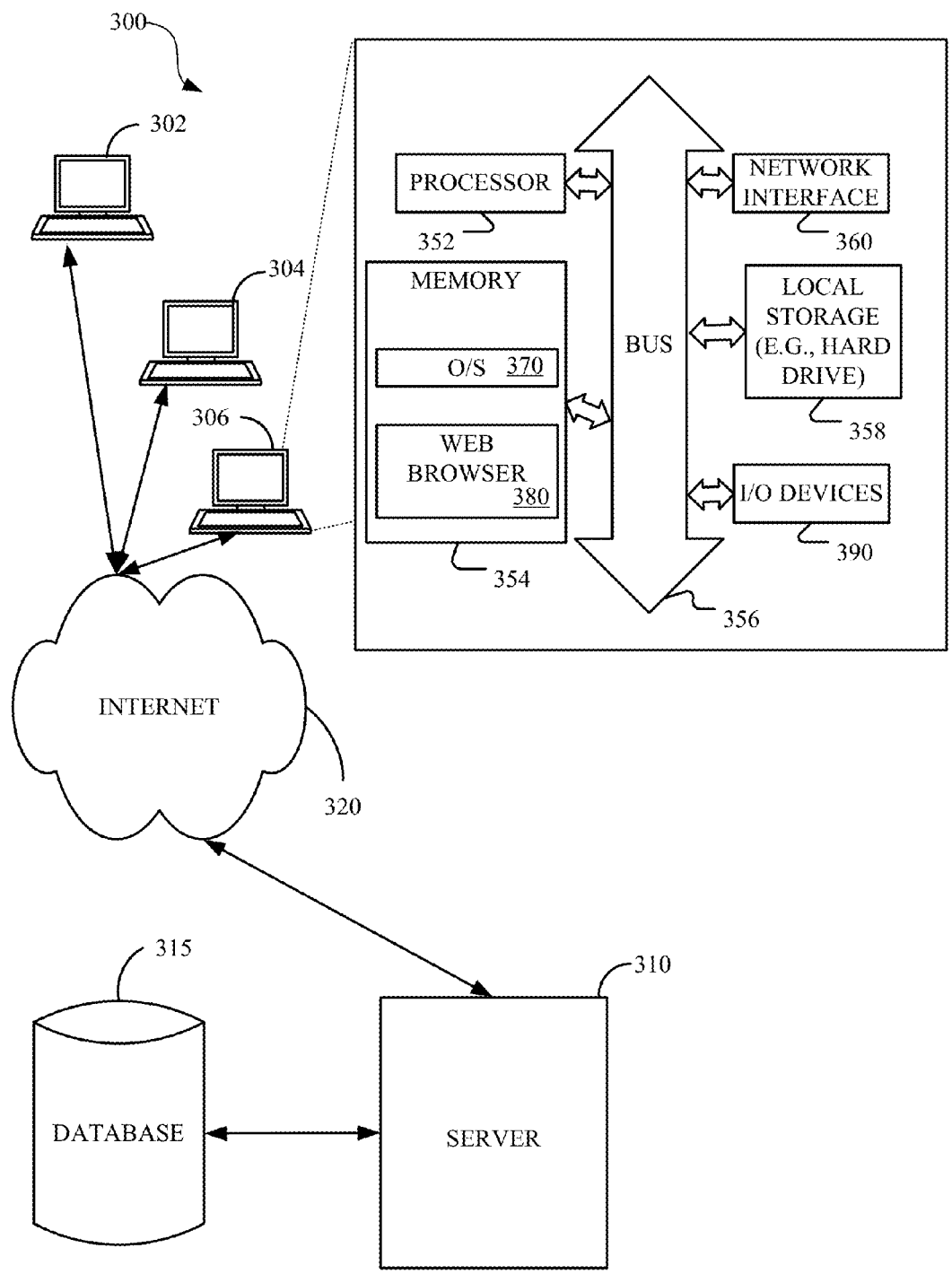
FIG. 3 is a block diagram of one embodiment of a system for accessing workspace web sites and other documents from a web server utilized in the system of FIG. 1.

Next, FIG. 3 is a block diagram of one embodiment of a system 300 for accessing workspace web sites and other documents from web server 151. As shown in FIG. 3, the system 300 comprises general-purpose computers 302, 304, 306 that are coupled to a server 310 over a network such as the Internet 320. The communication network 320 provides access to Internet services such as email, file transfer protocols (FTP), World Wide Web (WWW), Internet Relay Chat (IRC), etc. and newsgroups, such as Usenet, among others. The server 310 is coupled to a database 315 that stores profiles of members in an organization, such as utilized by an enterprise directory. In one embodiment, an enterprise directory follows the Lightweight Directory Access Protocol (LDAP).

In the operating environment shown in FIG. 3, a user of a general-purpose computer 306 (or other computing device such as a personal digital assistant) attempts to access stored applications on the computer 306 and network services from the network 320. As shown in FIG. 3, the general-purpose computer 306 includes a processor 352, a network interface 360, memory 354, a local storage device 358, and a bus 356 that permits communication between the various components. While not explicitly shown, it should be appreciated that the other computers 302, 304 may also include similar components that facilitate computation or execution of applications on the computers 302, 304. In some embodiments, among others, the local storage device 358 is a hard drive configured to electronically store data. The local storage device 358 may also store computer programs that execute on the computer 306. In this sense, the processor 352 is configured to access any program that is stored on the local storage device 358, and execute the program with the assistance of the memory 354.

The network interface 360 is configured to provide an interface between the general-purpose computer 306 and the network 320. Thus, the network interface 360 provides the interface for the computer 306 to receive any data that may be entering from the network 320 and, also, to transmit any data from the computer 306 to the network 320. Specifically, in some embodiments, the network interface 360 is configured to permit communication between each of the computers 302, 304, 306 and the server 310 and, additionally, to permit communication between the computers 302, 304, 306 themselves. In this regard, the network interface 360 may be a modem, a network card, or any other interface that communicatively couples each of the computers 302, 304, 306 to the network 320. Since various network interfaces are known in the art, further discussion of these components is omitted here.

The memory 354 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 354 may incorporate electronic, magnetic, optical, and/or other types of storage media. Note that the memory 354 can have a distributed architecture, where various components are situated remote from one another, but can be accessed by the processor 352.

The software in memory 354 may include one or more separate programs, each of which comprises an ordered listing of executable instructions for implementing logical functions. In the example of FIG. 3, the software in the memory 354 includes a web browser application 380 and an operating system (O/S) 370. The operating system 370 controls the execution of other computer programs, and provides scheduling, input-output control, file and data management, memory management, and communication control and related services.

The I/O devices 390 may include input devices, for example but not limited to, a keyboard, mouse, scanner, digital camera, multi-function device, digital sender, microphone, etc. Furthermore, the I/O devices 390 may also include output devices, for example but not limited to, a printer, display, etc. Finally, the I/O devices 390 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

The software in the memory 354 may further include a basic input output system (BIOS) (omitted for simplicity). The BIOS is a set of software routines that initialize and test hardware at startup, start the O/S 370, and support the transfer of data among the hardware devices. The BIOS is stored in ROM so that the BIOS can be executed when the computer 306 is activated.

When the computer 306 is in operation, the processor 352 is configured to execute software stored within the memory 354, to communicate data to and from the memory 354, and to generally control operations of the computer 306 pursuant to the software. The web browser 380 and the O/S 370, in whole or in part, are read by the processor 352, perhaps buffered within the processor 352, and then executed.

Referring back to FIG. 1, within one embodiment of the collaborative workspace system 100, an eworkspace application 105 is executed by the server 151. One function of the eworkspace application 105 is to make administrative assignments to members within an enterprise organization. In one embodiment, the enterprise has an enterprise or corporate directory of organization members. Therefore, at least one member is assigned as a super administrator for the enterprise using the eworkspace application 105. As long as a user is a registered user of the directory (such as an employee, contractor, partner to the enterprise), then he or she can be assigned as a super administrator for the eworkspace application 105. The super administrator can manage and administrate each workspace site created or built with a framework of the eworkspace application 105. For example, the super administrator can create new workspaces or delete existing workspaces.

To set up an individual workspace, the super administrator initially assigns a member in the directory as a local administrator for a particular workspace project or site. Each workspace created by the eworkspace application 105 has one or more local administrators that manage resources for the individual workspace. An existing local administrator may also assign another member of the enterprise as a new local administrator to the workspace.

Figure 4:
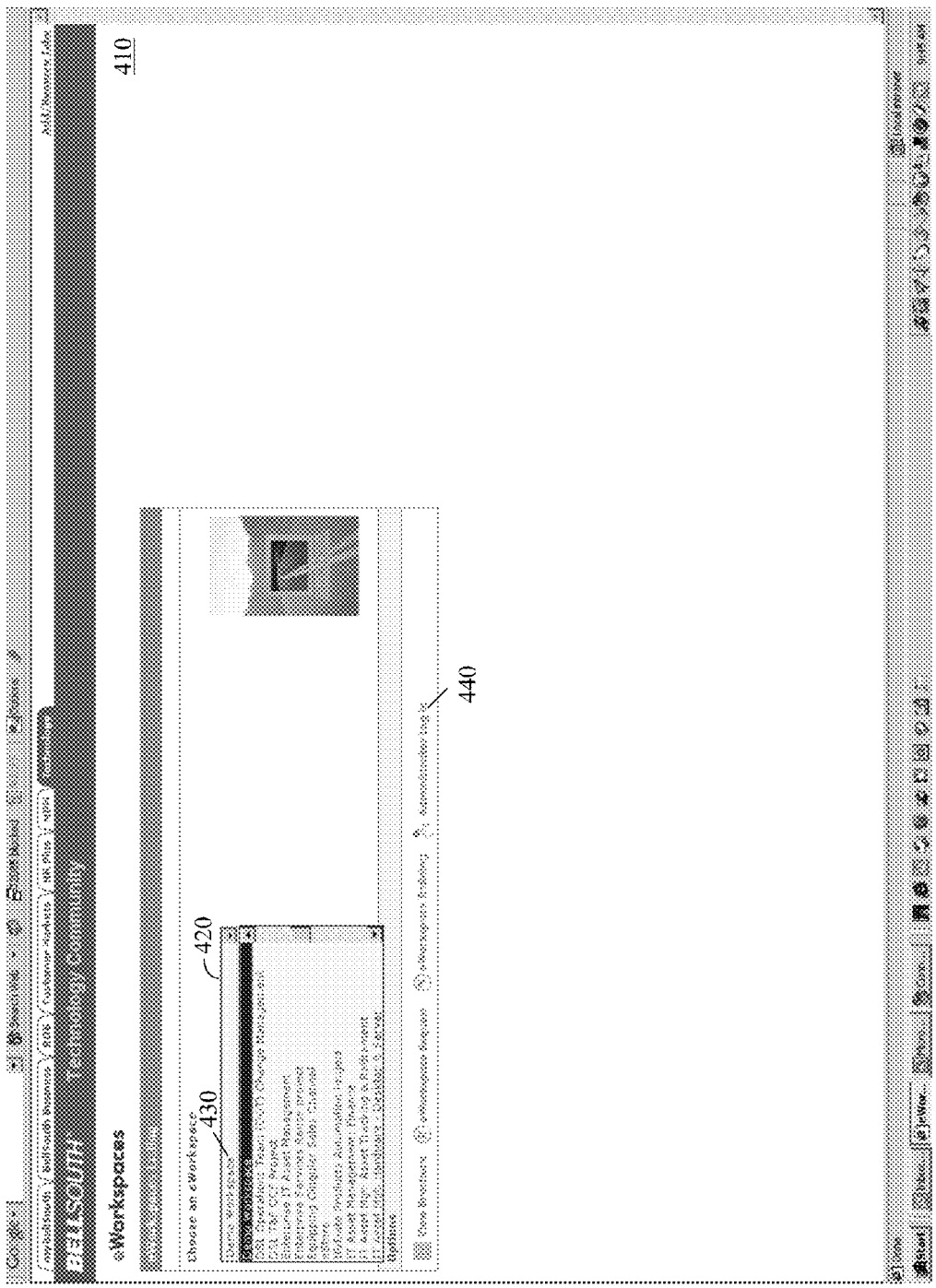
FIG. 4 is a screenshot diagram of a web interface to an "eworkspace" application utilized within the system of FIG. 1.

Referring now to FIG. 4, while a user is browsing content on the Internet (or some other communication network) via a browser application 380 (FIG. 3), the user may select links or applications (e.g., content) provided by a web page that takes the user away from the current web page. Further, the user may manually enter a web site into the address bar of his or her web browsing application or select a saved URL that is stored in a list of URL's (such as a bookmark file).

In the present example, a user browses to a web page interface 410 to the eworkspace application 105. In the example shown in FIG. 4, the user can scroll a list of workspaces that have been created using the eworkspace application 105 and are provided in a dropdown menu 420 within the interface 410. All of the different sites listed in the menu 420 have been created using the same framework authoring tool within the eworkspace application 105.

Based on chosen options within this framework that have been designated for a particular workgroup project, the eworkspace application 105 on the server 151 assembles the web pages that are delivered to a web browser of a user visiting a workspace site 110. These options are able to be set without advanced HTML skills of the administrator(s) for the workspace. For most options, radio buttons may be selected to turn the associated option off or on.

Referring back to FIG. 4, a user selects a workspace to visit entitled "Demo Workspace" 430 in the present example. It is noted that one of the available options below the dropdown menu is an Administrator Log In 440. After the user selects the "Demo Workspace" 430 from the dropdown menu 420, a home web page for the Demo Workspace is displayed via the user's browser application 105.

Figure 5:
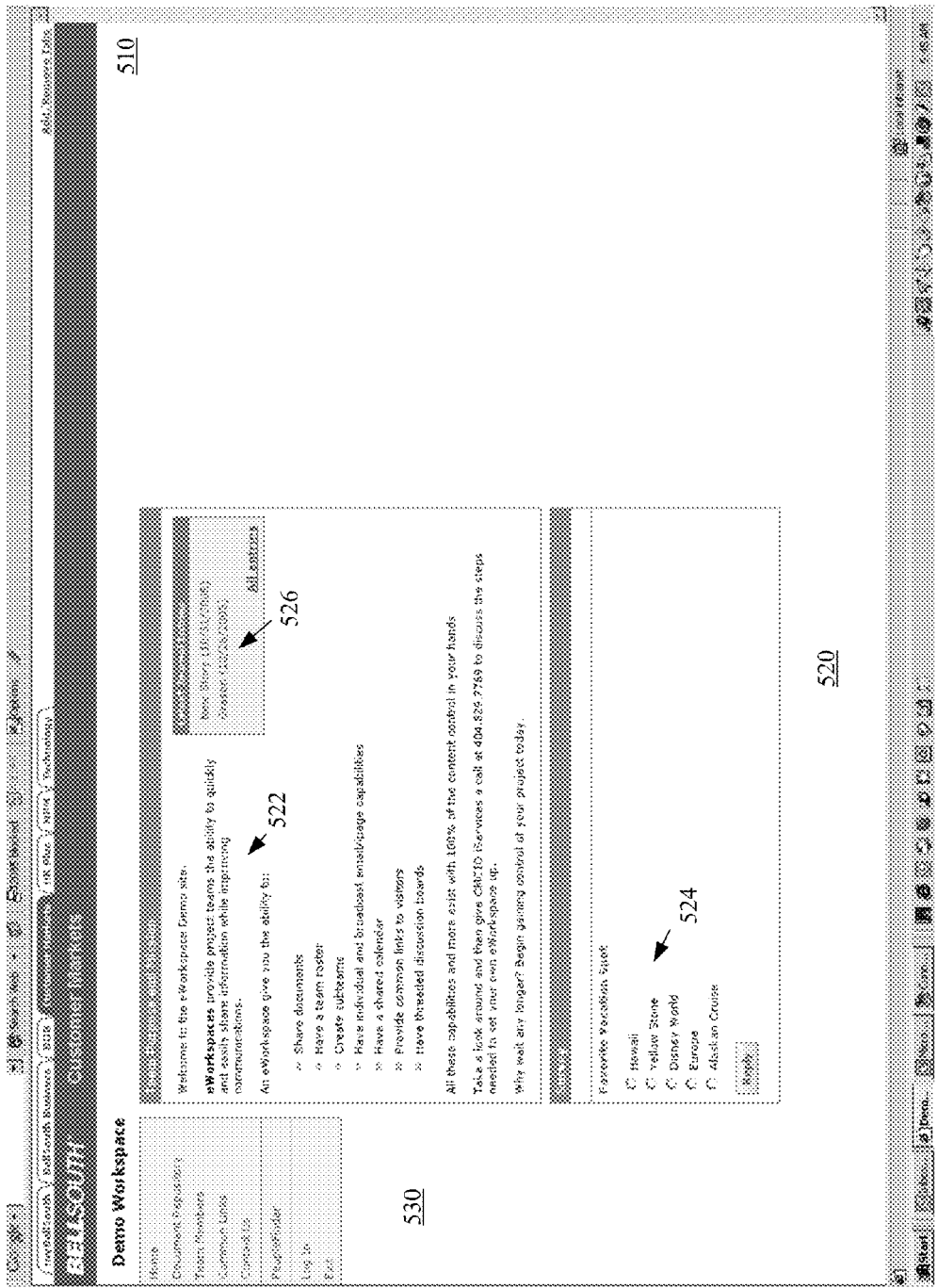

As shown in FIG. 5, content for the home page 510 is shown in a main area 520 of the web page 510 and a navigation pane 530 is displayed on the left side. Within the content displayed in the main portion 520 of the web page 510, informative text 522 is displayed, a survey 524 is displayed, and journal entries 526 are displayed. These may be easily configured by a local administrator of the Demo Workspace. In the screenshot view shown in FIG. 5, a public view of the web page 510 is being shown.

Figure 6:
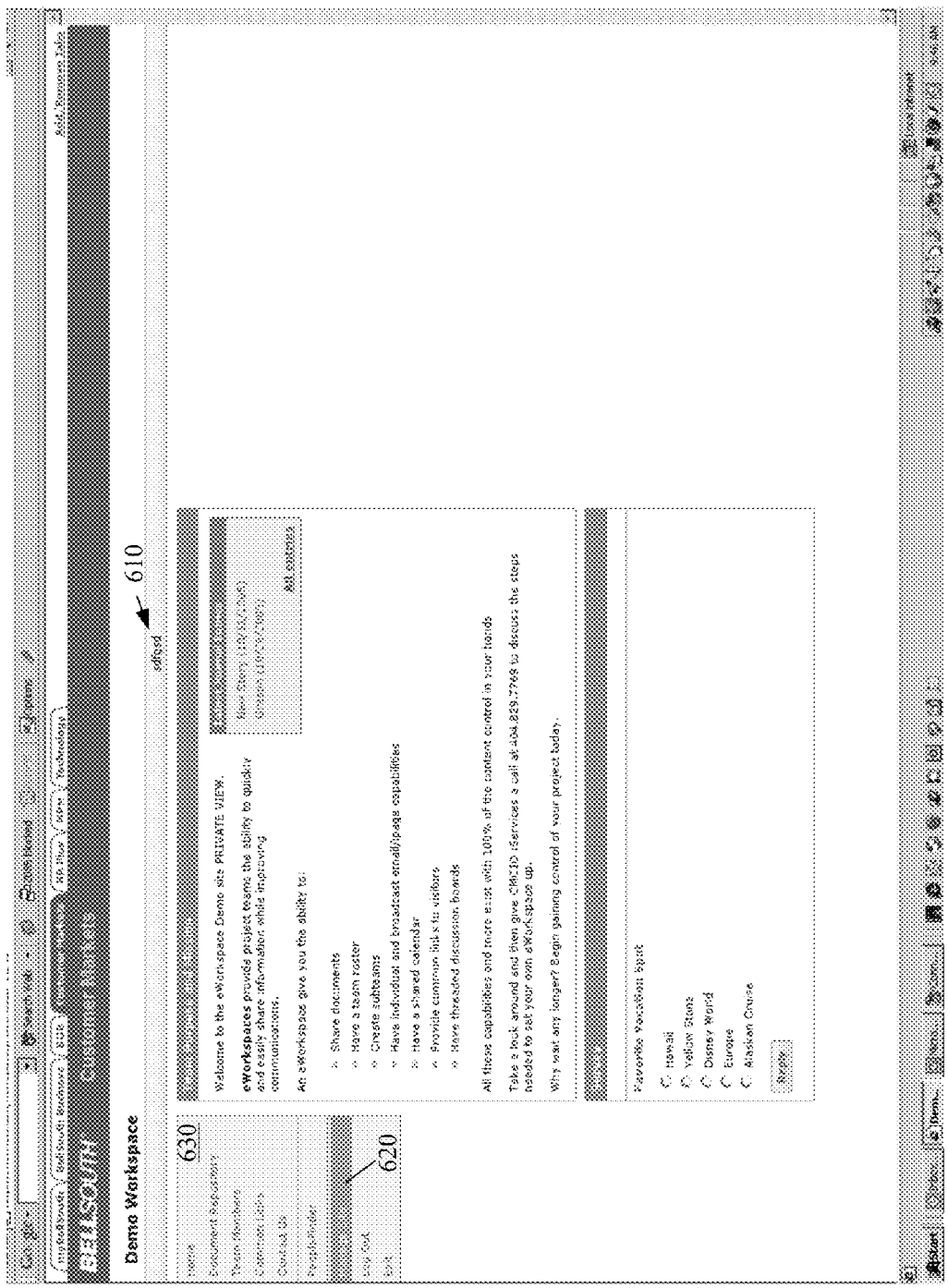

This public view may be seen by users who have not logged in and authenticated themselves as members of the enterprise organization. In comparison, FIG. 6 shows a private view of the same web page. The private view is activated when users log in as a member of the enterprise. In this example, an alert message 610 is shown in private view that is not shown in the public view. Therefore, an administrator can have a message delivered to members of the organization when the page is viewed that is not provided to non-members.

To create a new workspace, there are certain key data elements that need to be set up by an administrator to the workspace. For example, in FIG. 6, a member accessing the site has highlighted the "Manage Site" option 620 shown in the navigation pane 630 (e.g., positioning a mouse control over the link and depressing the left mouse button, etc.). This option 620 allows an administrator to access administrative options for configuring the "Demo Workspace."

Figure 7:
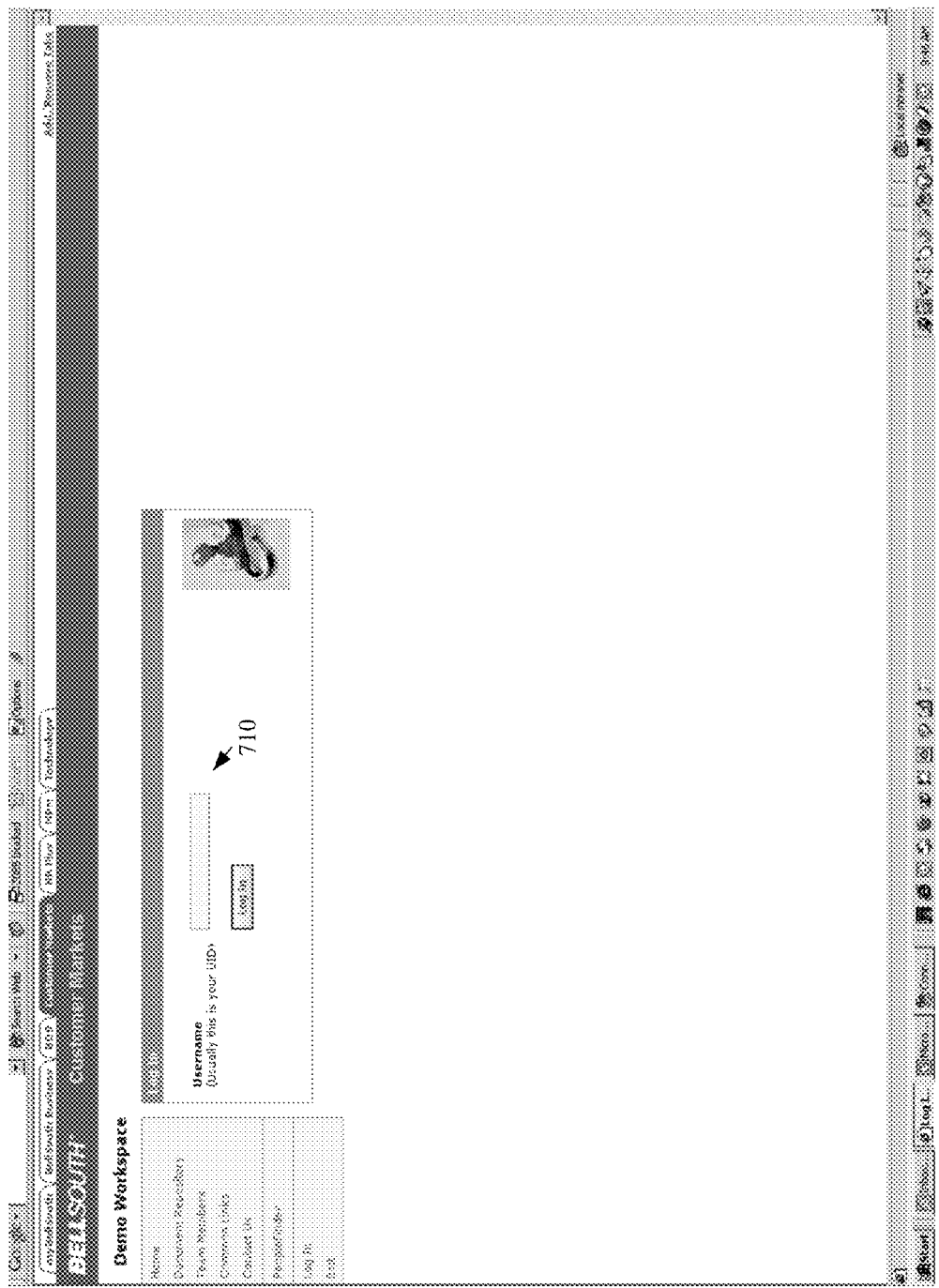

Accordingly, the next figure (FIG. 7) shows a log-in interface 710 where a user is prompted to input his or her username, which is a unique identification code in some embodiments for members of the enterprise. If the user is authenticated to be a member with administrative privileges, then the user is granted access to administrative tools for configuring a workspace site, as shown in FIG. 8.

Figure 8:
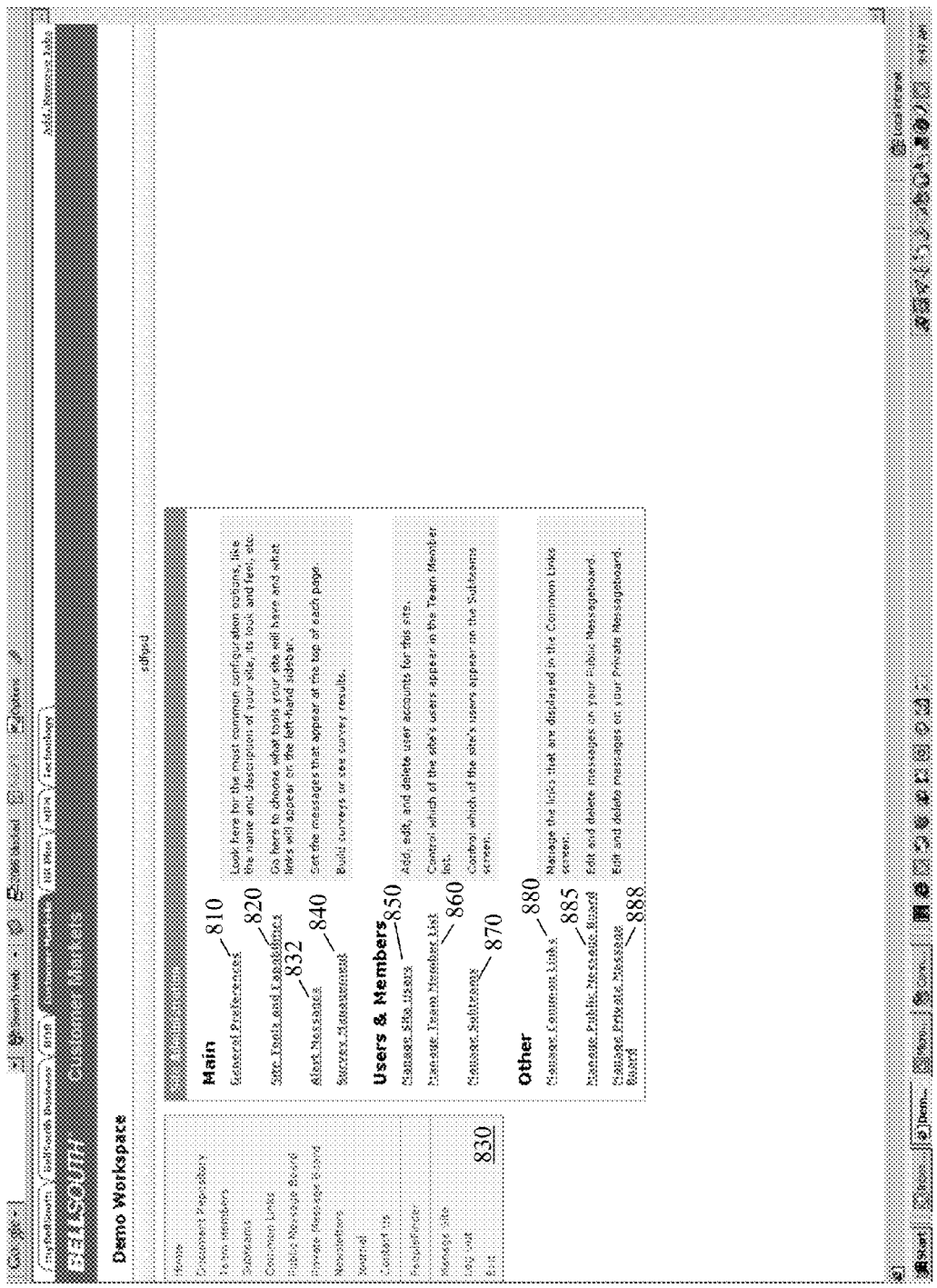

In FIG. 8, various options are provided for configuring settings and options associated with the Demo Workspace of the present example. By selecting a link and associated radio buttons or by entering text, different capabilities of a site configured for a workspace may be enabled.

Figure 9:
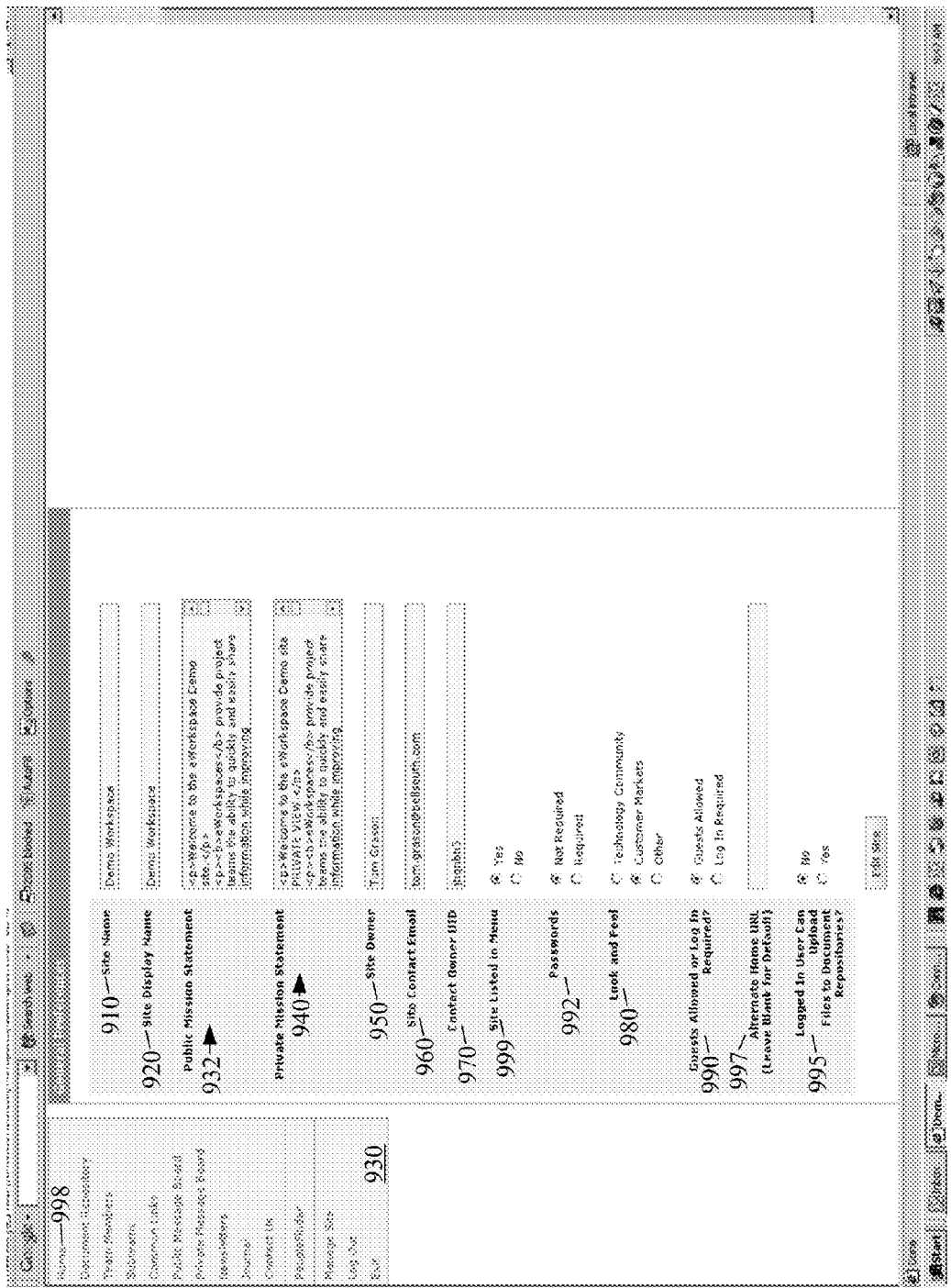

If the General Preferences link 810 is selected from the navigation pane 830 of the workspace site, a web page demonstrated in FIG. 9 is displayed, in one embodiment. Here, an administrator can specify global site configuration values for the workspace.

In the example shown, an administrator has specified "Demo Workspace" as the Site Name 910 that is associated with the workspace and "Demo Workspace" as the Site Display Name 920 that is displayed at the top of the first page of the workgroup site, as shown in FIG. 5. Also, welcome text or other descriptive information is prompted to be provided in a Public Mission Statement box 932 and a Private Mission Statement box 940. Accordingly, information inputted in the Public Mission Statement box will be shown to public users and the Private Mission Statement box will be provided to private users or users that have been authenticated as members of the enterprise organization.

The person that is regarded as the owner or the site administrator is also prompted to be specified as Site Owner 950 along with a Site Contact Email 960 and Contact Owner UID (unique identification code) 970. This person can receive emails from visitors to the site.

In some embodiments, options are provided for pre-configured color schemes and design that is regarded as a "Look and Feel" 980. Accordingly, the administrator can select a radio button for a look and feel associated with "Technology Community" or "Customer Markets" or choose "Other" if they would like to have another scheme.

Another configurable option 990 is to choose whether to allow guests to the site to have access or to require users to log-in as members to the enterprise organization. Also, there is the option 995 of allowing logged-in members to upload documents to the workspace site and an option 992 implementing password authentication. By default, only administrators can upload documents in one embodiment unless this setting is modified.

Another option 997 is provided for specifying an alternate URL address to the home page for the workspace. Accordingly, if a URL is provided, then when a user selects the "Home" link 998 in the navigation pane 930, the web page associated with the alternate URL is retrieved.

For example, if the workspace site is a sub-site to another site and the desire is to send visitor to the higher level site's home page instead of this sub-site's home page, this option 997 may be used. Otherwise, the home page is set to be the first page (see FIG. 5 or 6) of the workspace site as a default.

Another option 999 is to allow the site name of the work space in a global dropdown menu 420 of workspace sites, as shown in FIG. 4.

Figure 10:
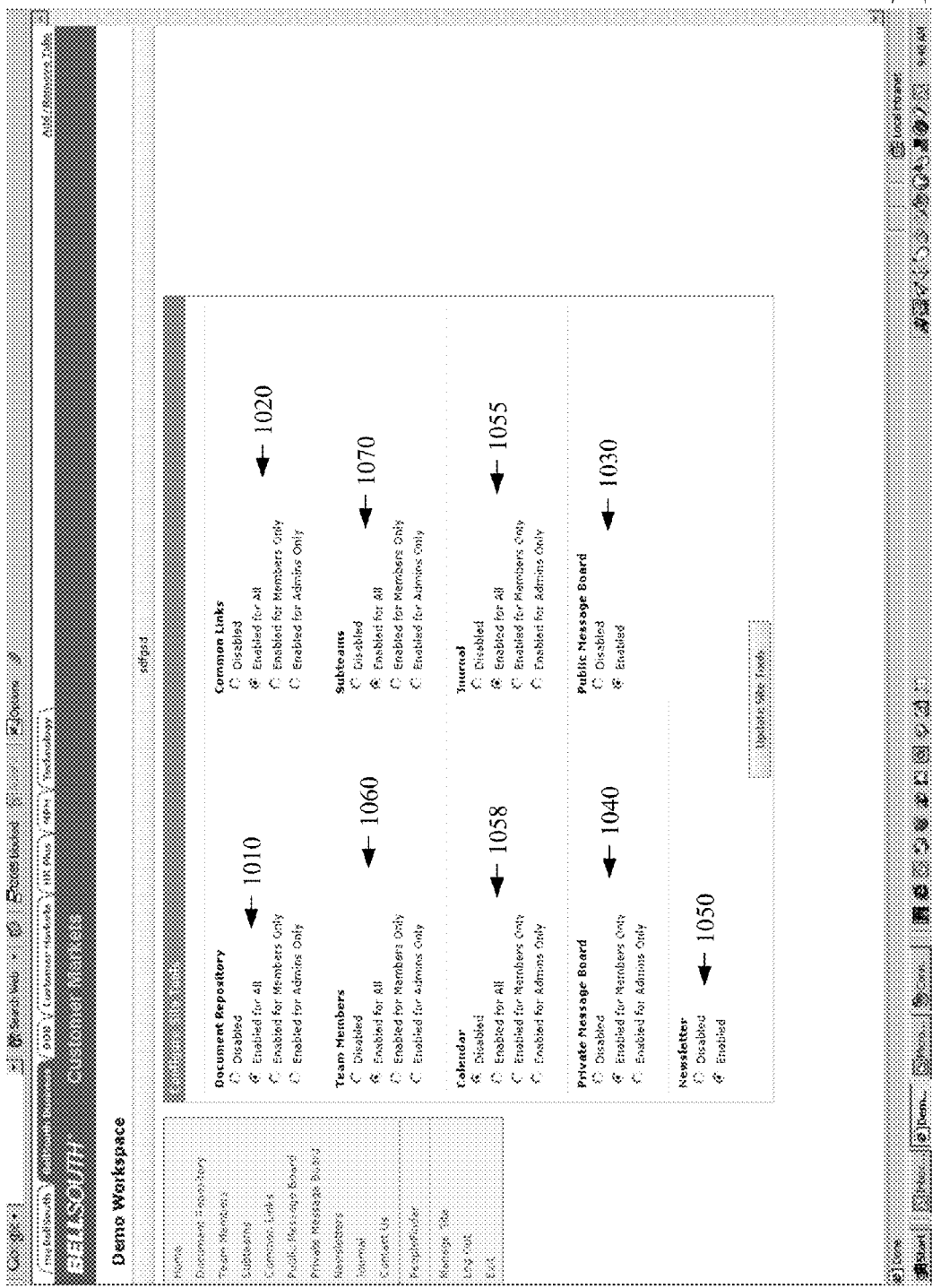

Referring back to FIG. 8, if the administrator selects the Site Tools and Capabilities Link 820, a web page depicted in FIG. 10 is shown. Here, the administrator has the ability to turn on or off site capabilities by toggling radio buttons, such as capabilities involved with the Document Repository 1010 (area where files may be uploaded and downloaded), Common Links 1020 (area where URLs of web pages may be provided), Public Message Board 1030, Private Message Board 1040, Newsletter 1050, Journal 1055, Calendar 1058, and areas of the workspace site for Team Members 1060, Subteams 1070, including deciding whether to provide tools for these functions/areas to everyone, members only, or administrative members only.

Figure 11:
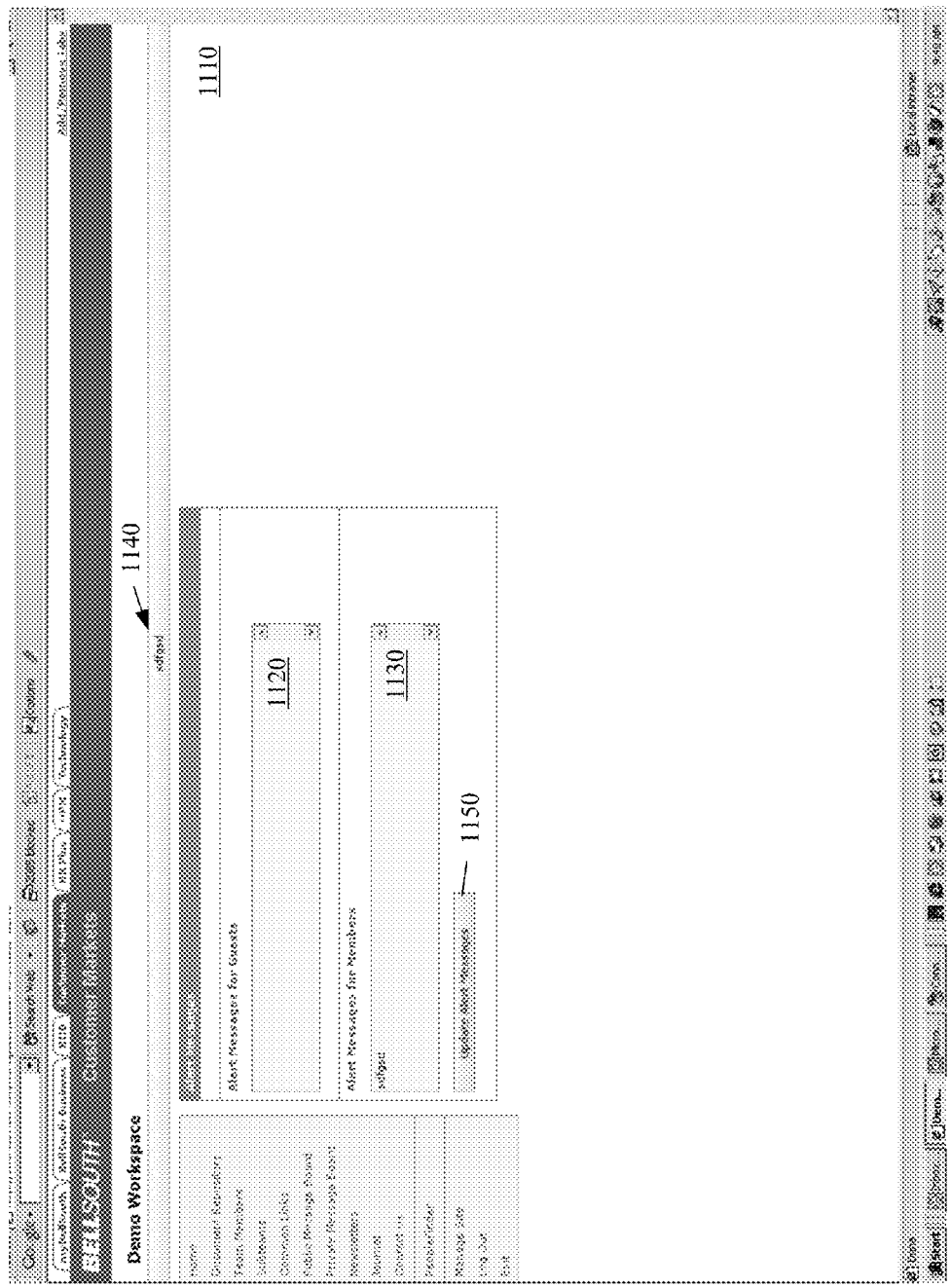

Next, in FIG. 11, content for alert messages may be configured, where one alert message may be displayed to guests during a public view of the workspace site and another alert message may be displayed to members in a private view of the site. The web page 1110 shown in FIG. 11 is displayed via a web browser application 380 in response to selection of the Alert Messages link 832 in FIG. 8.

If text for an alert message is inputted in the appropriate input box 1120, then across the top of a web page of all the pages of the workspace site, the alert message will be displayed for guests of the site in public view. Guests are users of the site that are not members registered in the directory of the enterprise organization. Likewise, if text for an alert message is inputted in the input box 1130, the message is displayed at the top of pages of the site in private viewing by members of the enterprise organization.

For example, in the figure, text has been provided for the Alert Messages for Members box 1130. The text is "sdfgsd." Accordingly, in the figure, the alert message is shown at the top of the web site (as indicated by pointer 1140), since this page is only accessible by a user who is a member and has administrative privileges.

Therefore, the administrator is provided the ability to create a common message that may be placed at the top of all web pages and viewed by whatever audience is desired by the administrator, whether it be a public or private view. To update content of the alert messages, the Update Alert Messages button 1150 may be selected.

Figure 12:
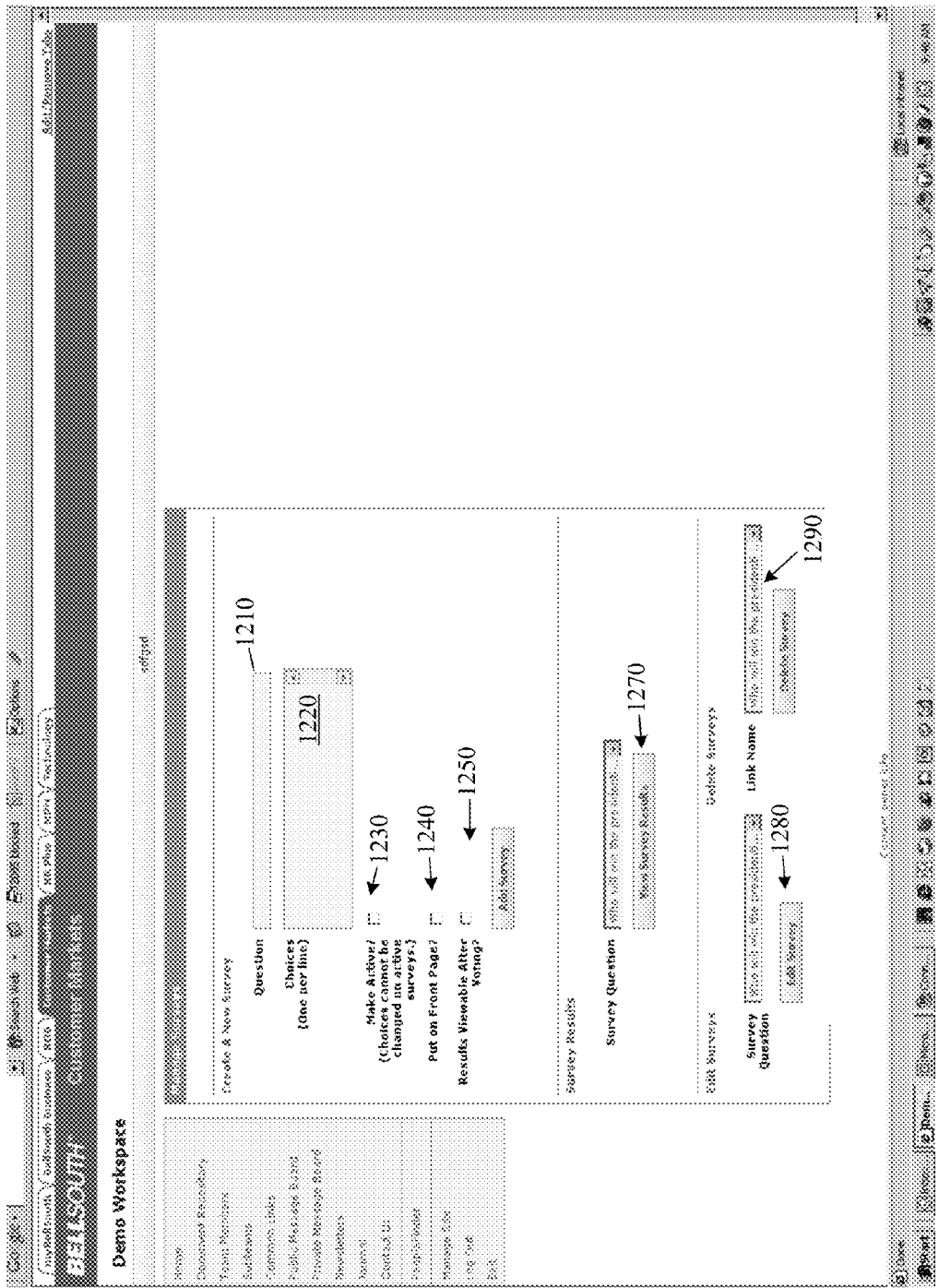

Referring back to FIG. 5, a survey 524 was referenced. To configure such a survey, the Survey management link 840 in FIG. 8 may be selected to cause the web page in FIG. 12 to be shown. Here, an administrator can create a survey for his or her workspace site and integrate it into the site easily.

As shown, the administrator is prompted to input a survey question into box 1210 and choices for responding to the question into box 1220. Options 1230 are also provided for making the survey active so that it is currently viewable by others and for choosing to display the survey on the front page of the site 1240. The option 1250 of showing the current results of the survey is also provided. Additional options also provide the ability to archive a survey and view survey results 1270 (e.g., percentage by response, number of votes by response, bar chart), ability to edit existing surveys 1280, and the ability to delete existing surveys 1290. In some embodiments, additional abilities are provided, such as the ability to export survey results to Excel® spreadsheet application, as provided by Microsoft Corporation.

Figure 13:
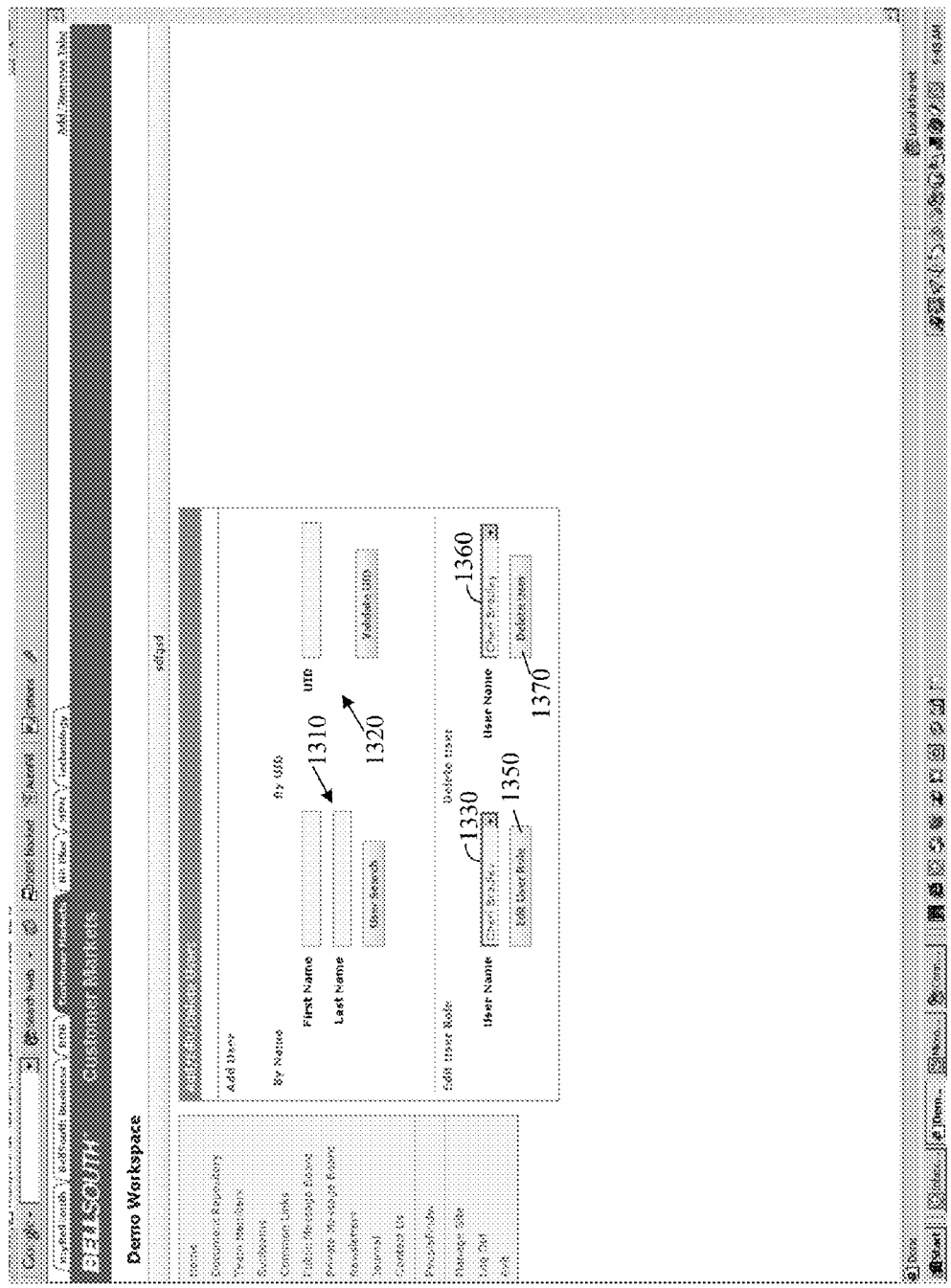

In addition to site capabilities, management tools involving determining which people visit the site and how they use site data is provided, in some embodiments. For example, selection of the Manage Site Users link 850 provided in FIG. 8 displays a page shown in FIG. 13. Here, members for the project team associated with the workspace site may be added, edited, or deleted.

To add a new member to the team, a search of the directory of an enterprise may be performed by specifying name information for a user into input boxes 1310 or by inputting the member's UID into the appropriate input box 1320. For pre-existing team members, a member's User Role may be changed (e.g., going from member to administrative user, going from guest to team member, etc.) by selecting the member from a dropdown menu of members 1330 and selecting the Edit User Role button 1350.

To delete a user from the team, the name of the user may be selected from a dropdown menu of members 1360 and the Delete User button 1370 may be selected. Additional interface windows or pages may then be displayed to complete the editing or deletion processes.

Accordingly, in some embodiments, to be a member to the workspace, a user has to be registered in a directory of users, such as an employer's directory. An administrator can also assign some members to teams and subteams that have heightened access privileges as compared to a regular member (who has higher access privileges than a guest). Note, team membership to the workspace includes additional user data to be maintained separately from the directory that is general to all members of the enterprise organization that are registered in the directory.

Figure 14:
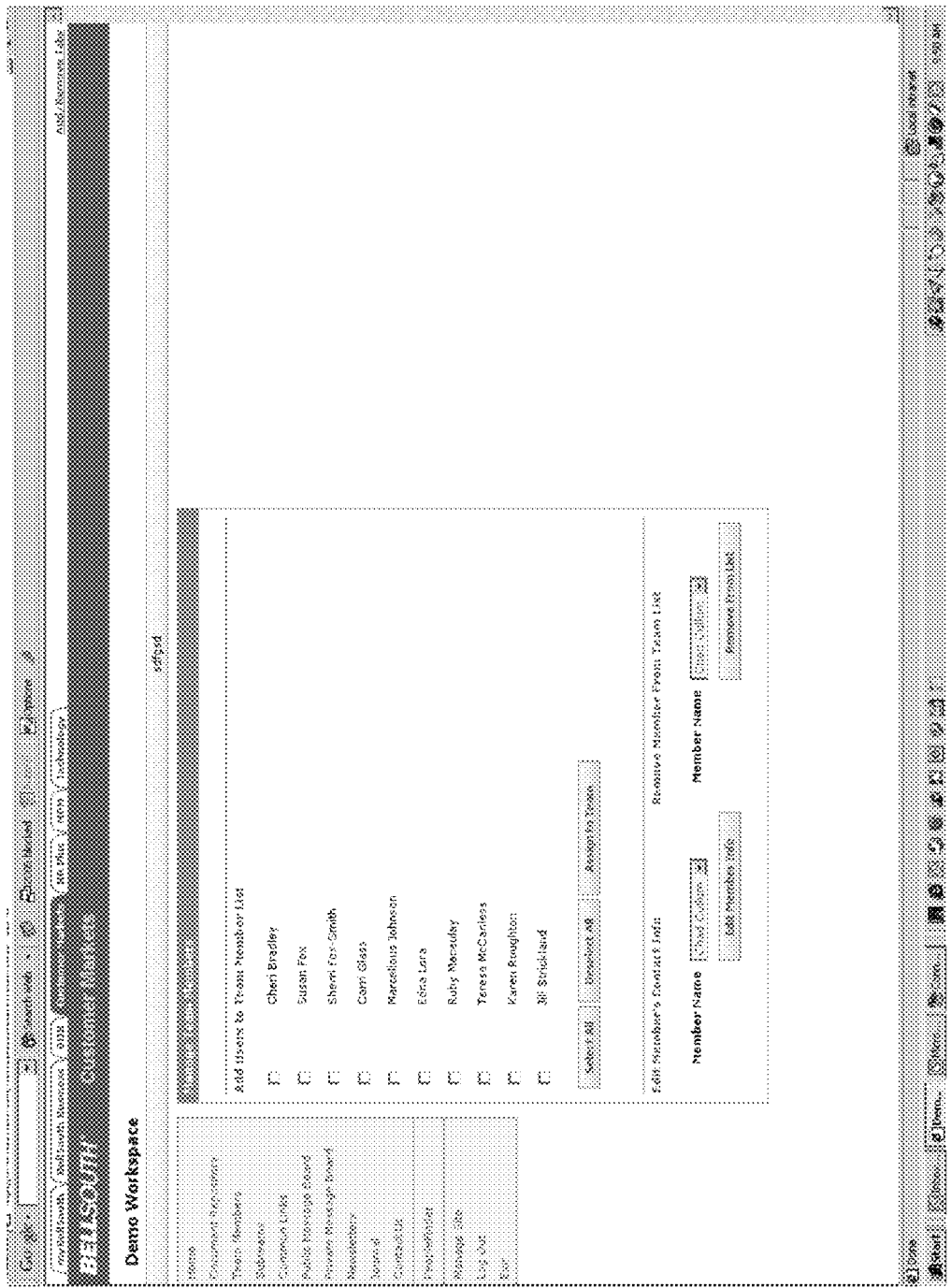

Referring back to FIG. 8, selection of the Manage Team Member List 860 causes a page shown in FIG. 14 to be displayed, in one embodiment. This page provides the ability to view a list of users that can be added as team members; the ability to view team members and their associated contact information (e.g., name, title, email, iPager®, phone number; the ability to click on team members name to link to directory XXX to retrieve and reveal additional information on the individual; the ability to click to send an email or send a pager message ("iPage") to an individual; and the ability to send an email or to send pager messages ("iPage") to the entire team list, and ability to download a soft copy of the team list for printing or distribution.

Figure 15:
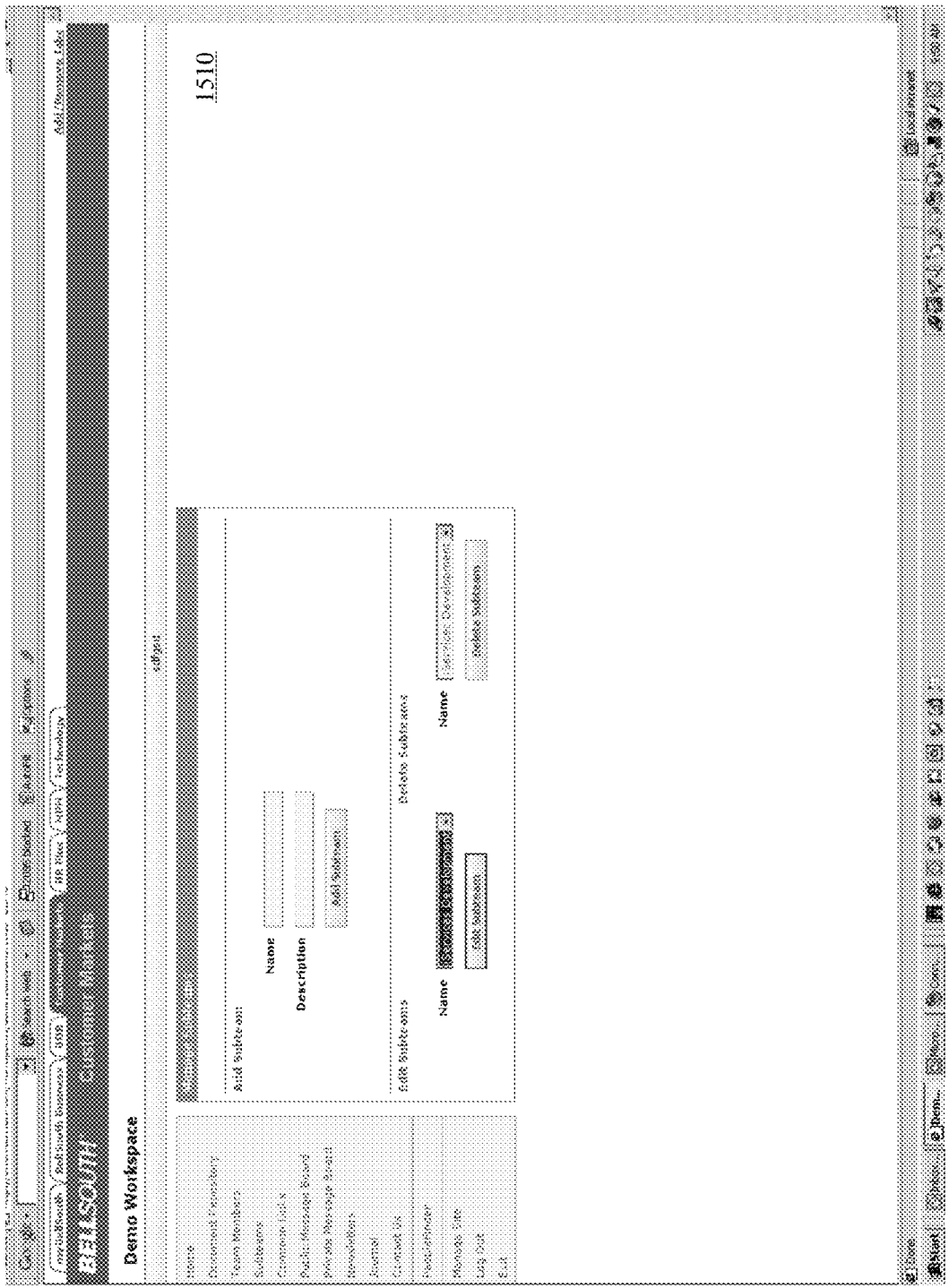

In addition to workspace teams, subteams may also be defined. To create a new subteam, the Manage Subteams link 870 in FIG. 8 may be selected which causes the page shown in FIG. 15 to be displayed, in one embodiment. Using this interface, members can be added or removed from subteams. Also, the Manage Subteams page 1510 also provides the ability to view subteams of team members; the ability to send an email or pager message to a selected subteam; the ability to create subteams; and the ability to assign team members to one or more subteams.

Figure 16:
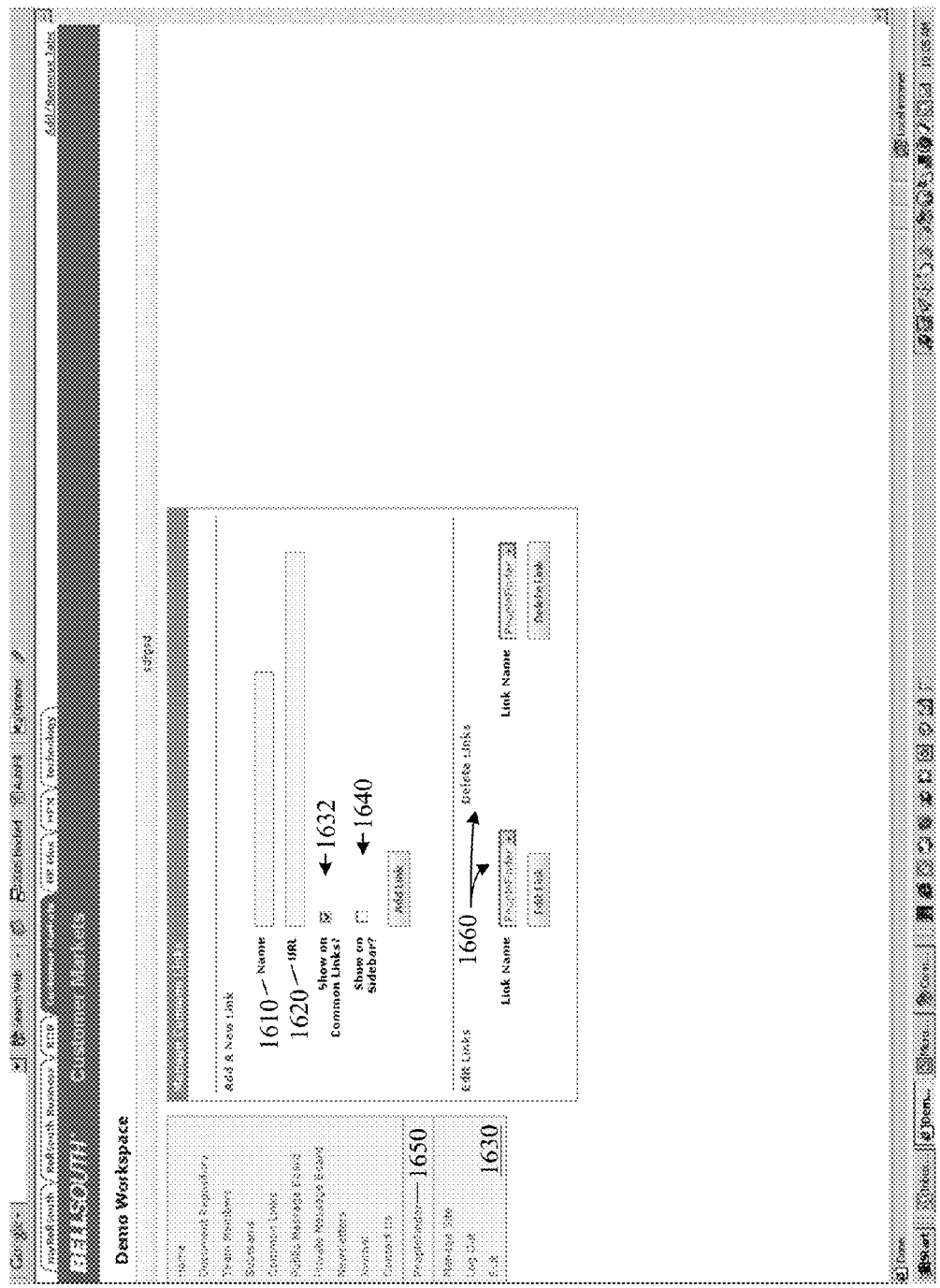

By selecting the Manage Common Links link 880 from the Site Administration page shown in FIG. 8, an interface is provided as shown in FIG. 16. Here, a Name 1610 for an external web site may be inputted, the URL may be provided in box 1620, and a checkbox 1632 may be activated if it is desired for the URL to be shown in a common links area or a checkbox 1640 may be selected if it is desired for the URL to be displayed on the left navigation pane 1630 of the site.

For example, a site named PeopleFinder 1650 has been provided as a common link and is displayed on the left side of the page shown in FIG. 16. In this way, certain key links may be provided so that everyone has quick access to them. As shown, tools 1660 are also provided for editing or deleting preexisting links by selecting a link from a dropdown menu.

Message boards are also provided within the workgroup sites built using the framework provided by the eworkspace application 105. As previously discussed with regard to the Configure Site Tools page of FIG. 10, private and public message boards may be configured to be provided within a workspace site.

Figure 17:
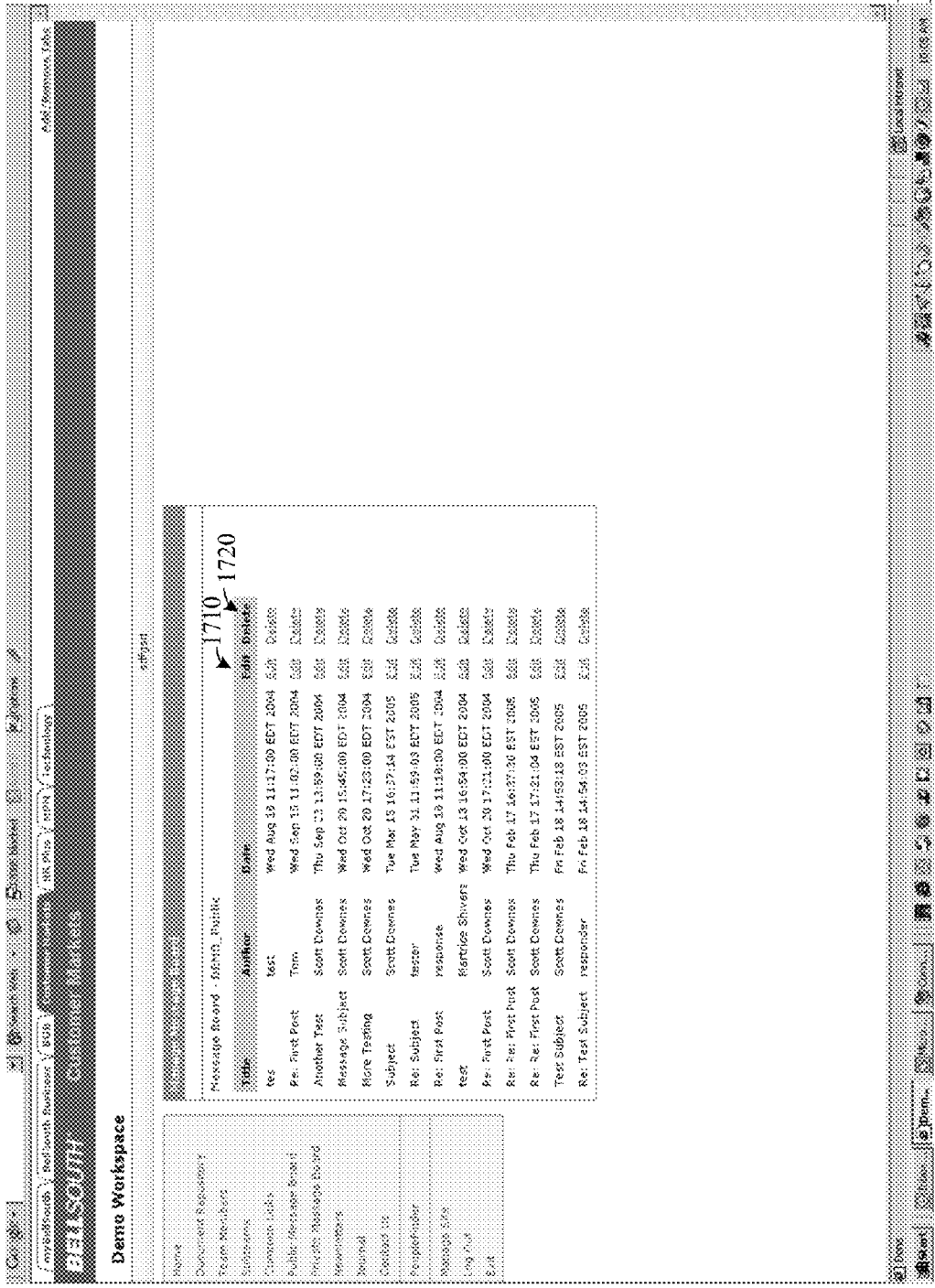

Within a message board, users can start and participate in discussions about topics pertinent to the project space. To manage the content of the public message board, the Manage Public Message Board link 885 may be selected by an administrator in FIG. 8. This causes the page shown in FIG. 17 to be displayed, in one embodiment.

Figure 18:
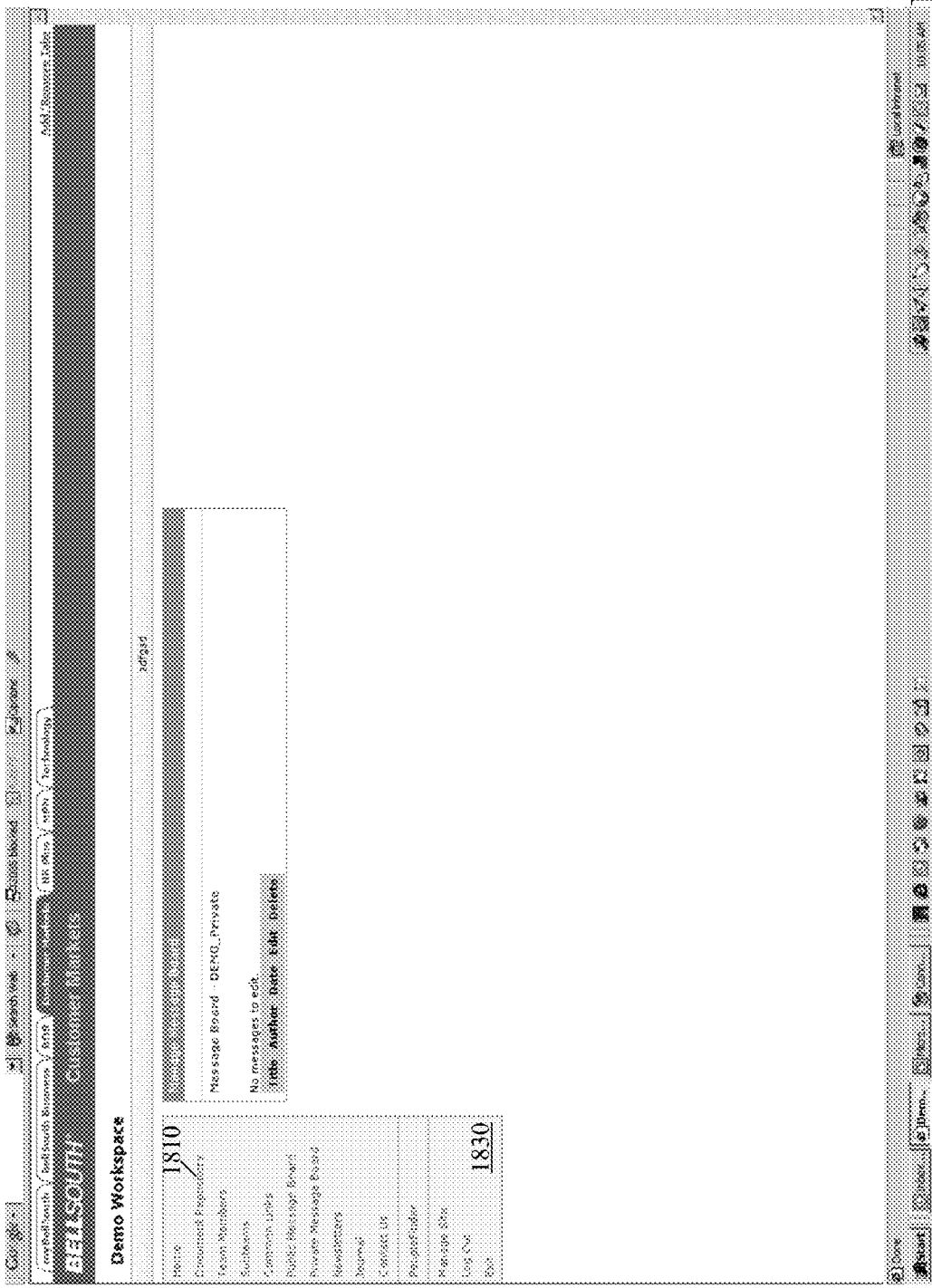

Here, the administrator is provided the options of editing or deleting individual posts by selecting an Edit link 1710 or Delete link 1720 next to the particular post. Likewise, by selecting the Manage Private Message Board link 888 in FIG. 8, posts within the Private Message Board may also be edited or deleted. In the particular example, the page shown in FIG. 18 is displayed in response to selection of the Manage Private Message Board link 888 but no posts have been made by any users in the current example, and therefore there are no posts available to be edited.

It is to be noted that each of the pages shown in the figures has a consistent look and feel for a "Customer Markets" corporate scheme that was selected by the administrator as an option in FIG. 9. Further, no HTML or advanced web design skills have been needed by the administrator to configure the workspace site.

Also, in some embodiments, pieces of administrative functionality are embedded in some of the tools themselves and are displayed whenever a user has sufficient access privileges.

Figure 19:
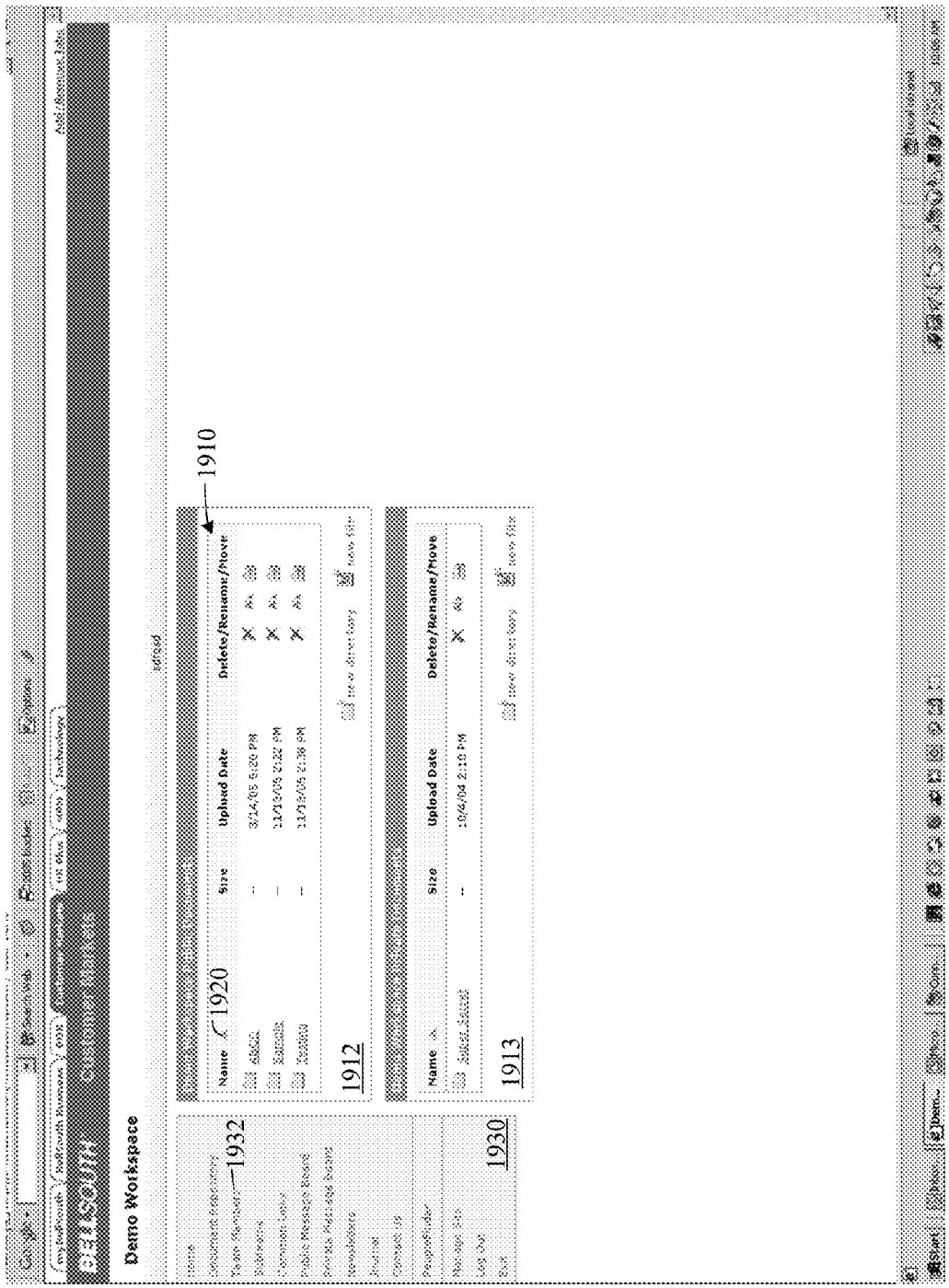

For example, if an administrator selects the Document Repository link 1810 from the navigation page 1830 on the left of the page, the web page for the document repository area is shown, as shown in FIG. 19. However, since the user has administrative privileges, options 1910 are provided to delete/rename/move directories and files provided in the repository.

Accordingly, if a user is a member to the site and is not a guest, then a repository 1912 for Private Documents is enabled to be viewed. Otherwise, only the repository 1913 for Public Documents is shown.

In this example, the administrator is the only user authorized to upload documents since the option from the General Preferences page (see FIG. 8) was not enabled for other users. Once a file is uploaded, the file size and date that the file was uploaded is provided and displayed on the web page. This lets everyone else know which file is the latest version to be uploaded, for example. Additional tools 1920 allows nested folders to be created and headers to be sorted. Accordingly, the workspace site provides the ability to upload, delete, rename and move documents/folders; the ability to create add, delete, rename and move directories; the ability to view Private documents when authenticated into the site; the ability to view the file structure including folders and files (including size and last change date); and the ability to sort view of file structure by name, size and last change date, in one or more embodiments.

Figure 20:
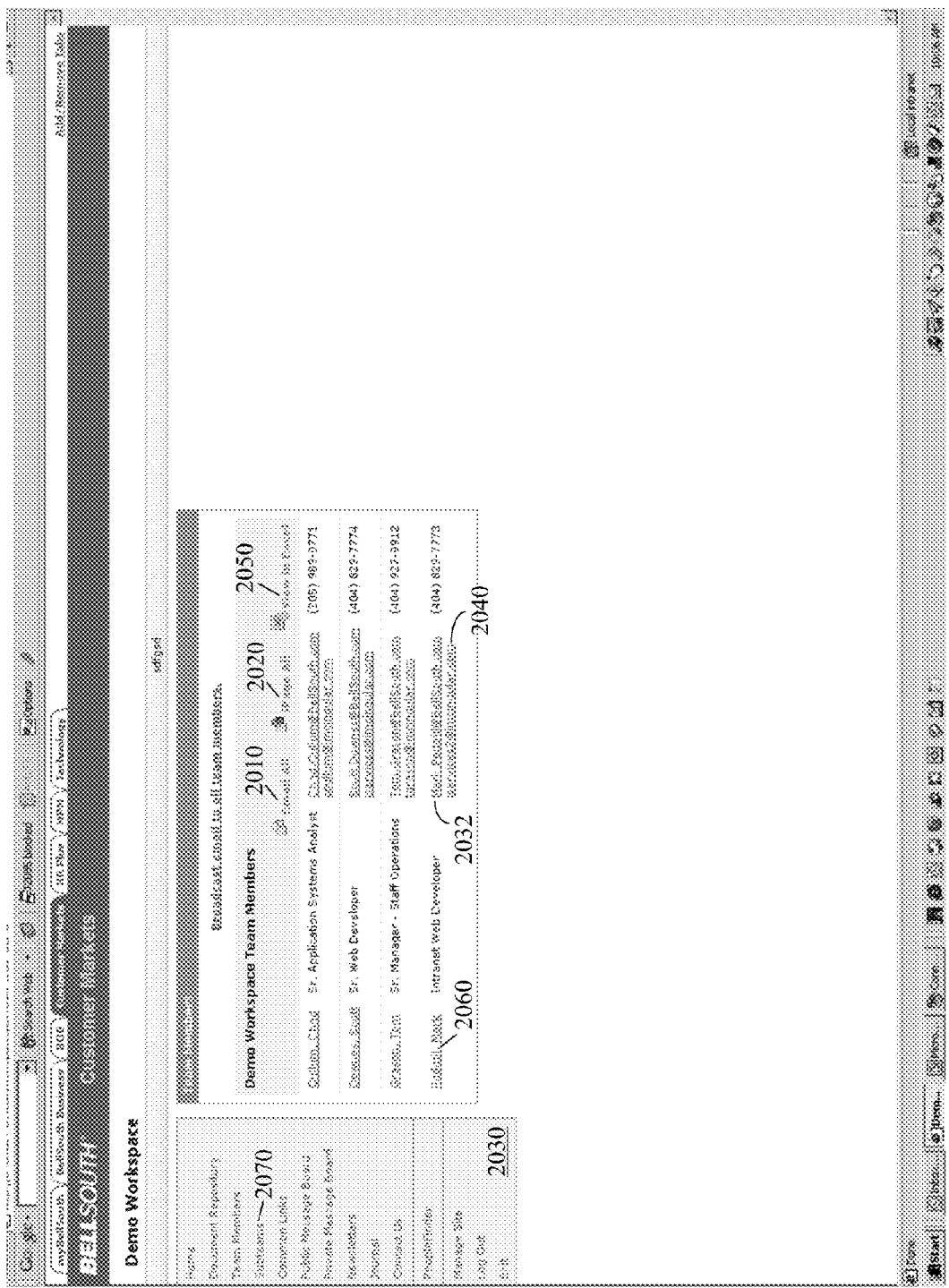

Referring back to the left navigation pane 1930, selection of the Team Members link 1932 causes a page shown in FIG. 20 to be displayed via the web browser application 380. Here, current team members are displayed with descriptive information (e.g., job titles) and contact information. By selecting the Broadcast Email All link 2010, users can broadcast emails to all team members (instead of having to keep distribution lists updated). Likewise to send messages to all team member's pagers, the iPage All link 2020 may be selected. Also, to send a direct message to an individual team member, the email address 2032 or the iPager address 2040 for the individual may be selected.

In one embodiment, this causes an application, such as Outlook® application provided by Microsoft Corporation, to be opened that has been associated by the browser application and operating system with that particular type of messaging format. Likewise, to view the displayed information in an Excel® spreadsheet document, the View in Excel® link 2050 may be selected. With the Excel® spreadsheet document, the document may be saved in an electronic file or printed as a hard copy.

Selection of a member's name 2060 causes data, such as contact information for the member, to be retrieved from the directory and displayed.

Figure 21:
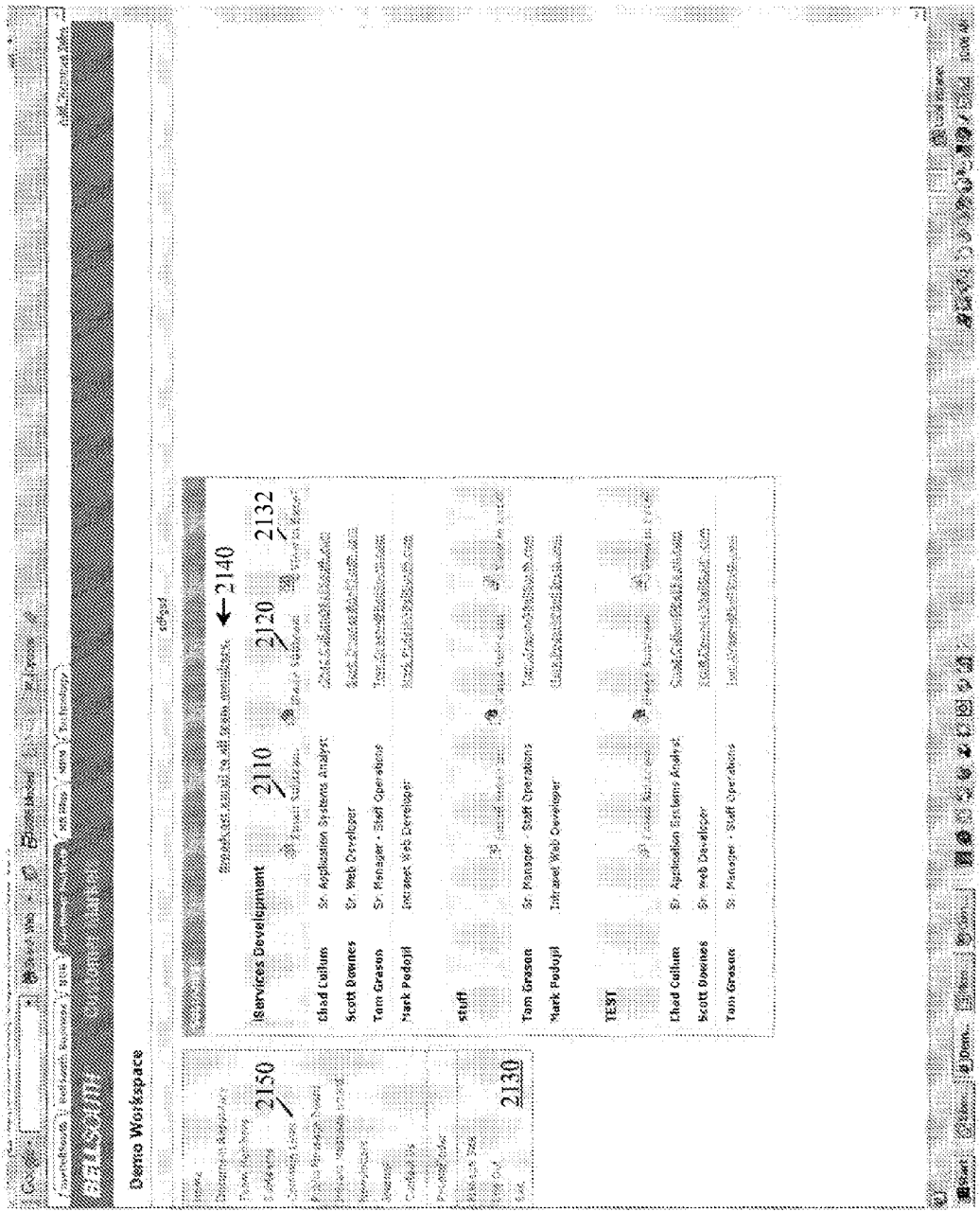

Similarly, information for subteams may be viewed by selecting the Subteams link 2070 from the navigation pane 2030. In the example shown in FIG. 21, members for three subteams (iServices Development, stuff, and TEST) are shown. For each, links are provided to: email each member of a subteam (via Email Subteam links 2110); send messages to pager devices (via iPage Subteam links 2120), and view the subteam information in an Excel spreadsheet (via View in Excel links 2132). Also, a link 2140 is provided to broadcast an email to all team members (e.g., the Broadcase email to all team members link).

Figure 22:
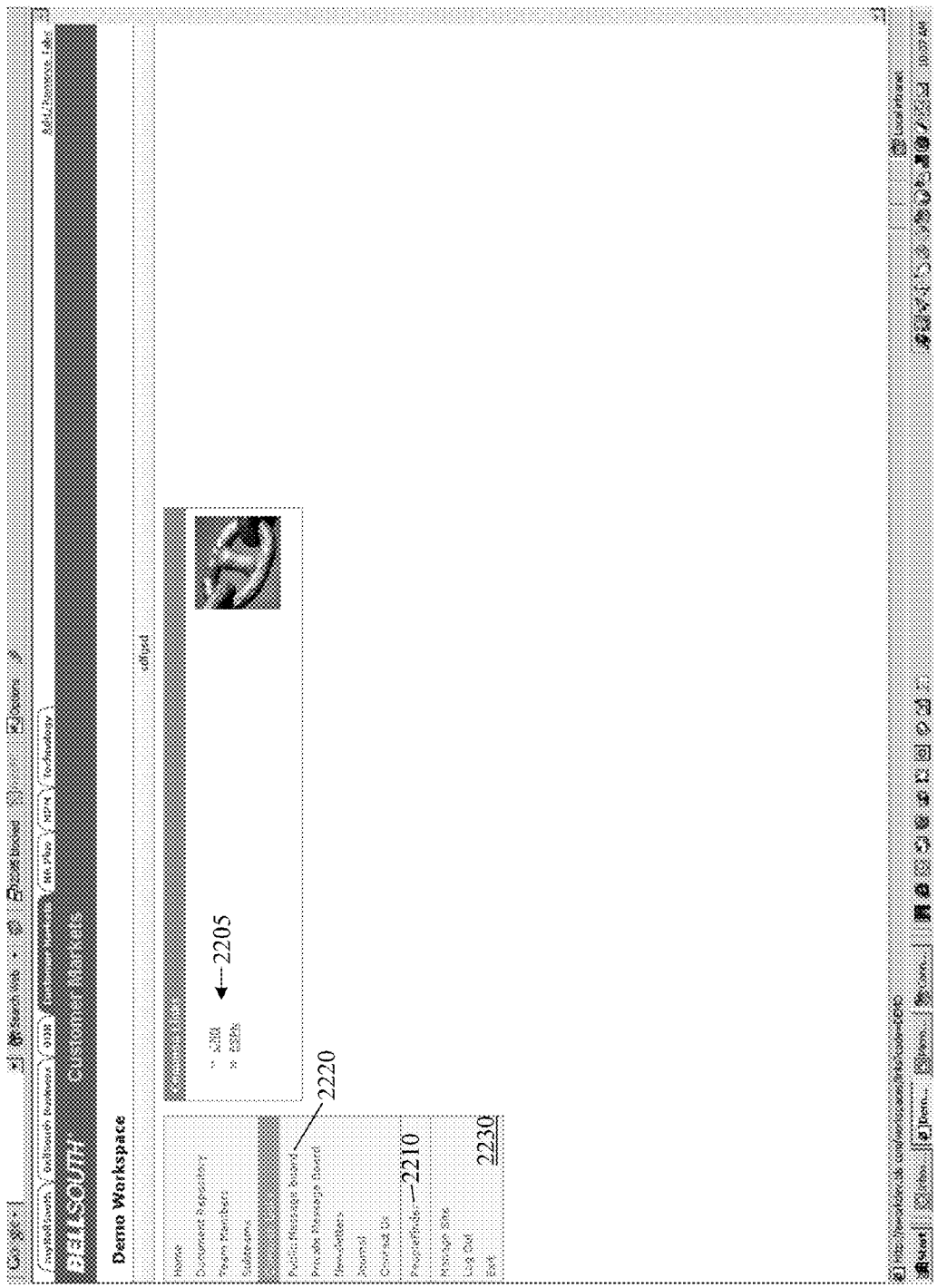

To view external links to web pages, a user can select the Common Links link 2150 in the left navigation pane 2130 to cause a page of external links to be provided, as shown in FIG. 22. An external link 2205 can point to any internet or intranet web page or document. Also, as previously mentioned, a workspace site may also have a common link that has been added as a common navigation link across all pages of the site, as demonstrated by the PeopleFinder link 2210 in the navigation pane 2230.

Figure 23:
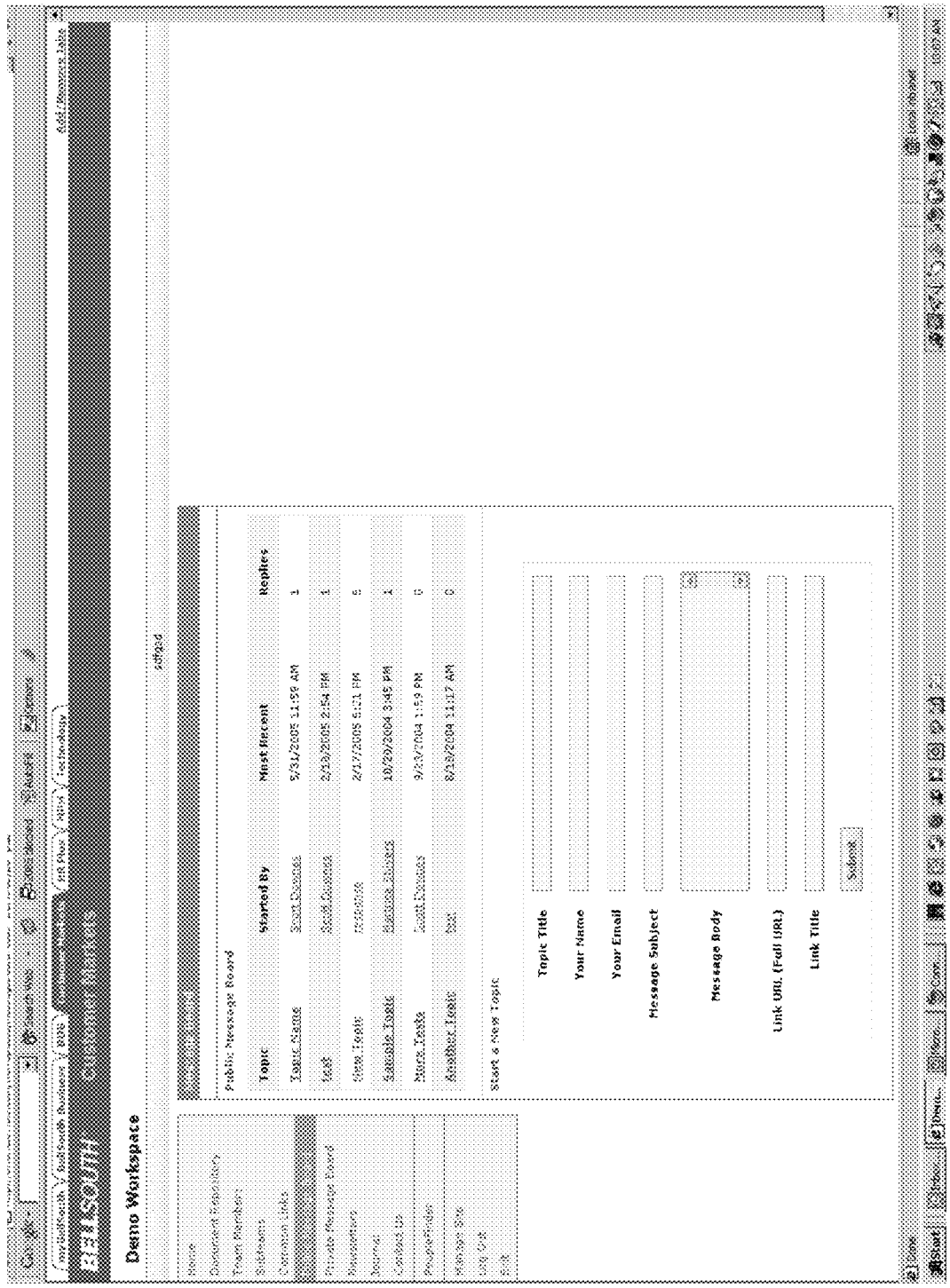
Figure 24:
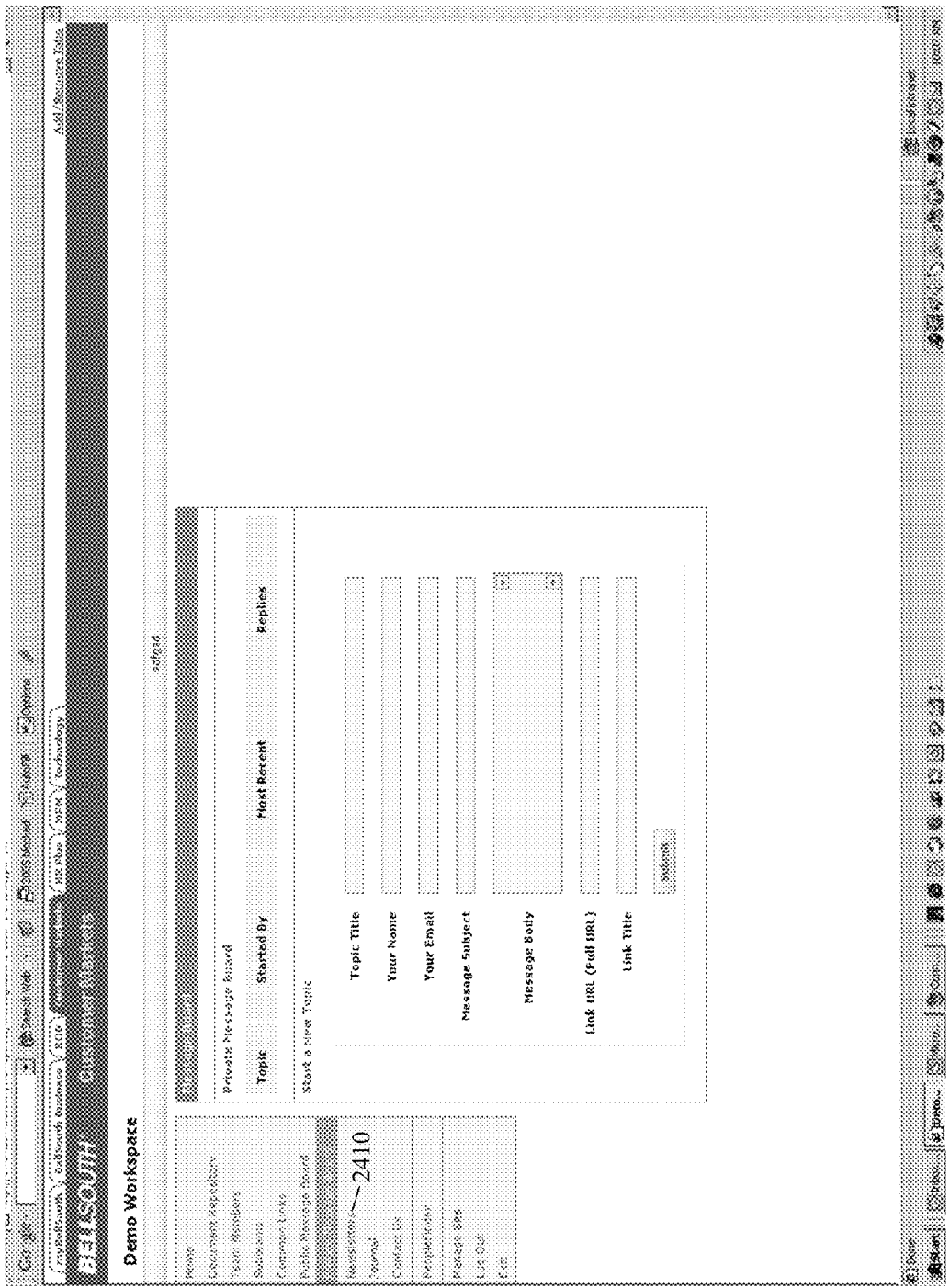

For viewing the public message board area of the worksgroup site (as shown in FIG. 23), a user can select the Public Message Board link 2220 from the left navigation pane 2230. Similarly, to view the private message board area of the worksgroup site (as shown in FIG. 24), the Private Message Board link may also be selected (if the logged in user has appropriate access rights).

Within the message board areas, some embodiments provide the abilities to post a discussion topic; to post a reply to a discussion topic; to post a reply to an existing reply; to view a listing of discussion topics and the number of replies; to delete individual replies; and to delete an entire discussion topic and all posted replies. Within a post, links to external or internal web content may also be provided.

Figure 25:
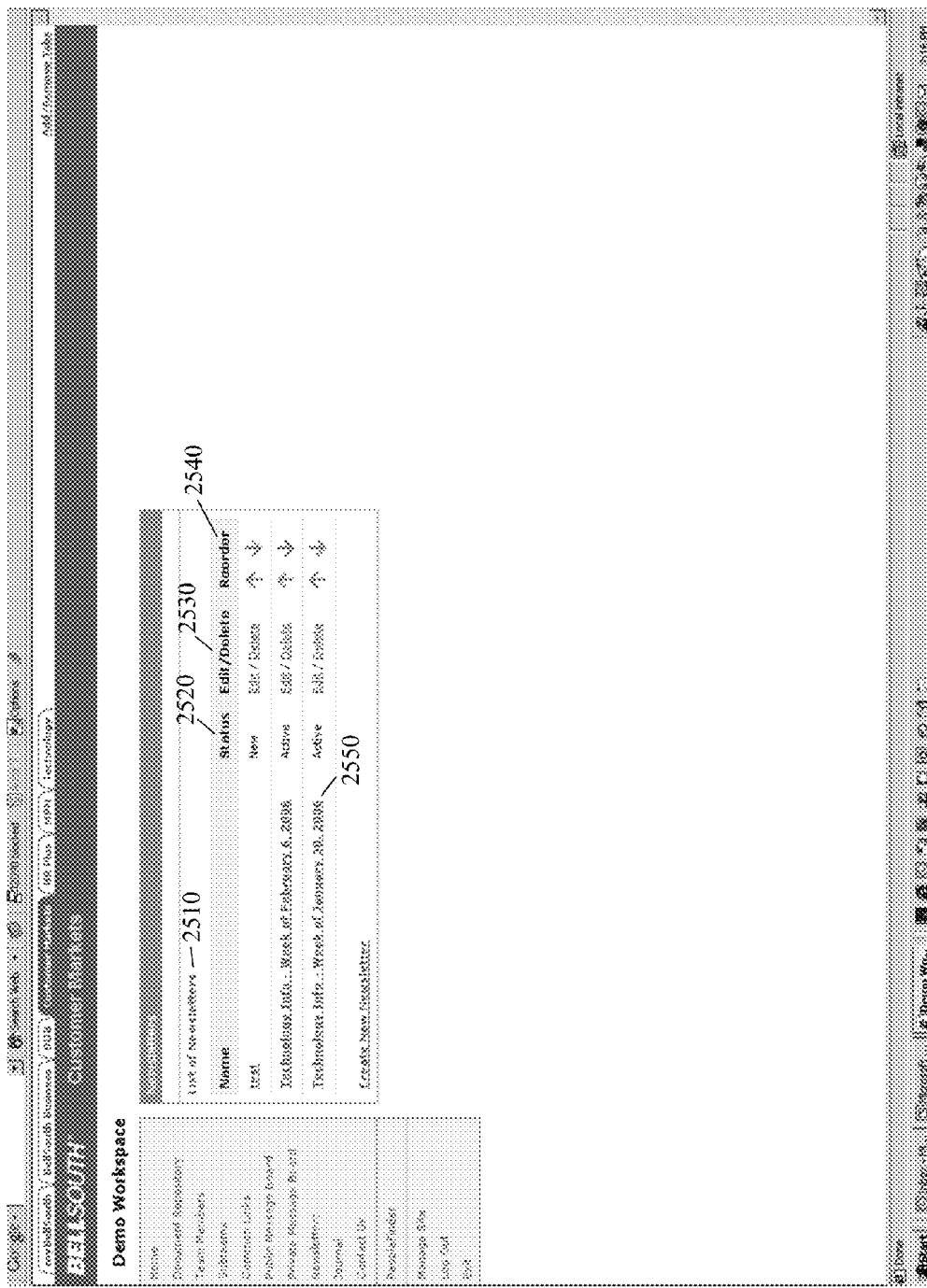

For newsletter functions, the Newsletters link 2410 in the navigation pane may be selected which will cause a page to be retrieved having the current newsletters, as shown in FIG. 25. Here, a list 2510 of newsletters is shown with the respective status 2520 of each. Also, for users that have the appropriate administrative privileges, links 2530 are provided to edit or delete current newsletters or to reorder how the newsletters are displayed. Also, a link 2540 is provided to create a new newsletter.

Figure 26:
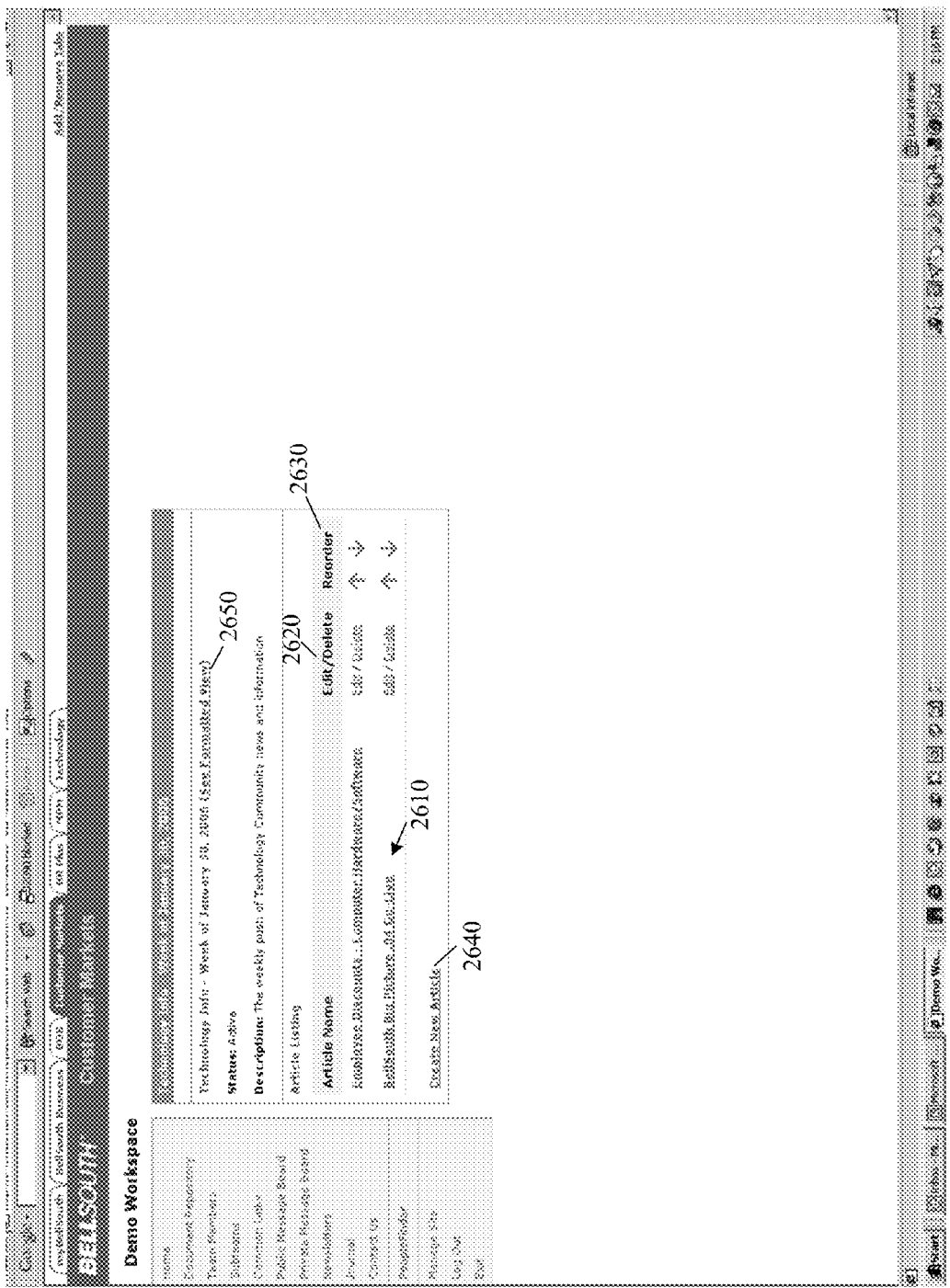

If an individual newsletter is selected, such as the Technology Info—Week of Jan. 30, 2006 newsletter 2550, then the contents for the newsletter is shown in a new page, such as that shown in FIG. 26. Accordingly, links 2610 are provided to access individual articles contained in the newsletter.

Figure 27:
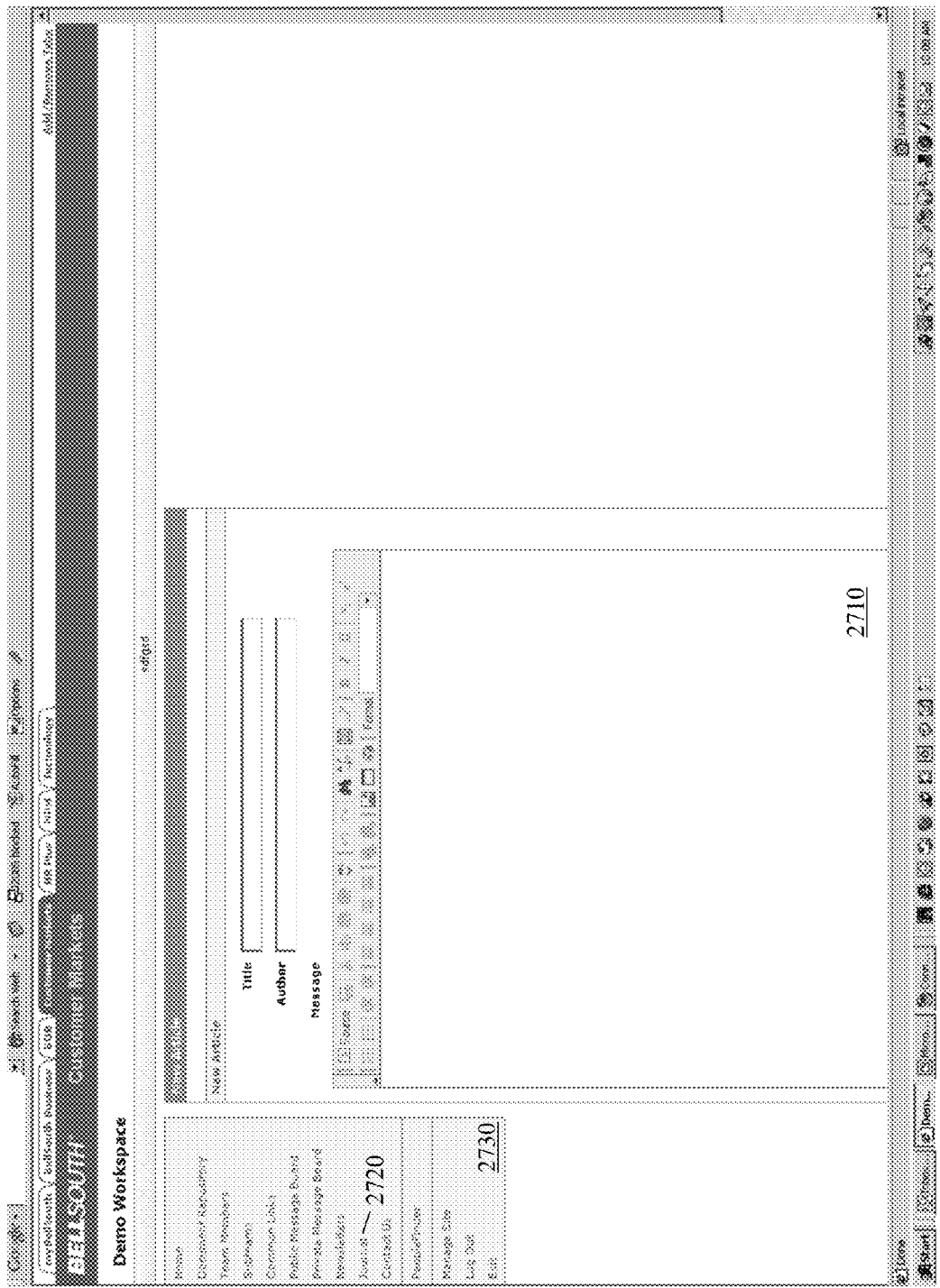

Similarly to the previous figure, a user with sufficient access privileges can edit or delete articles within the newsletter and also reorder how articles are displayed by using the Edit/Delete links 2620 and Reorder links 2630. To create a new article, the Create New Article link 2640 may be activated. This results in a full HTML editor embedded in a page to be displayed so that a user can do styling (such as bold text), embed pictures, etc. One embodiment of the HTML editor 2710 is shown in FIG. 27.

Figure 28:
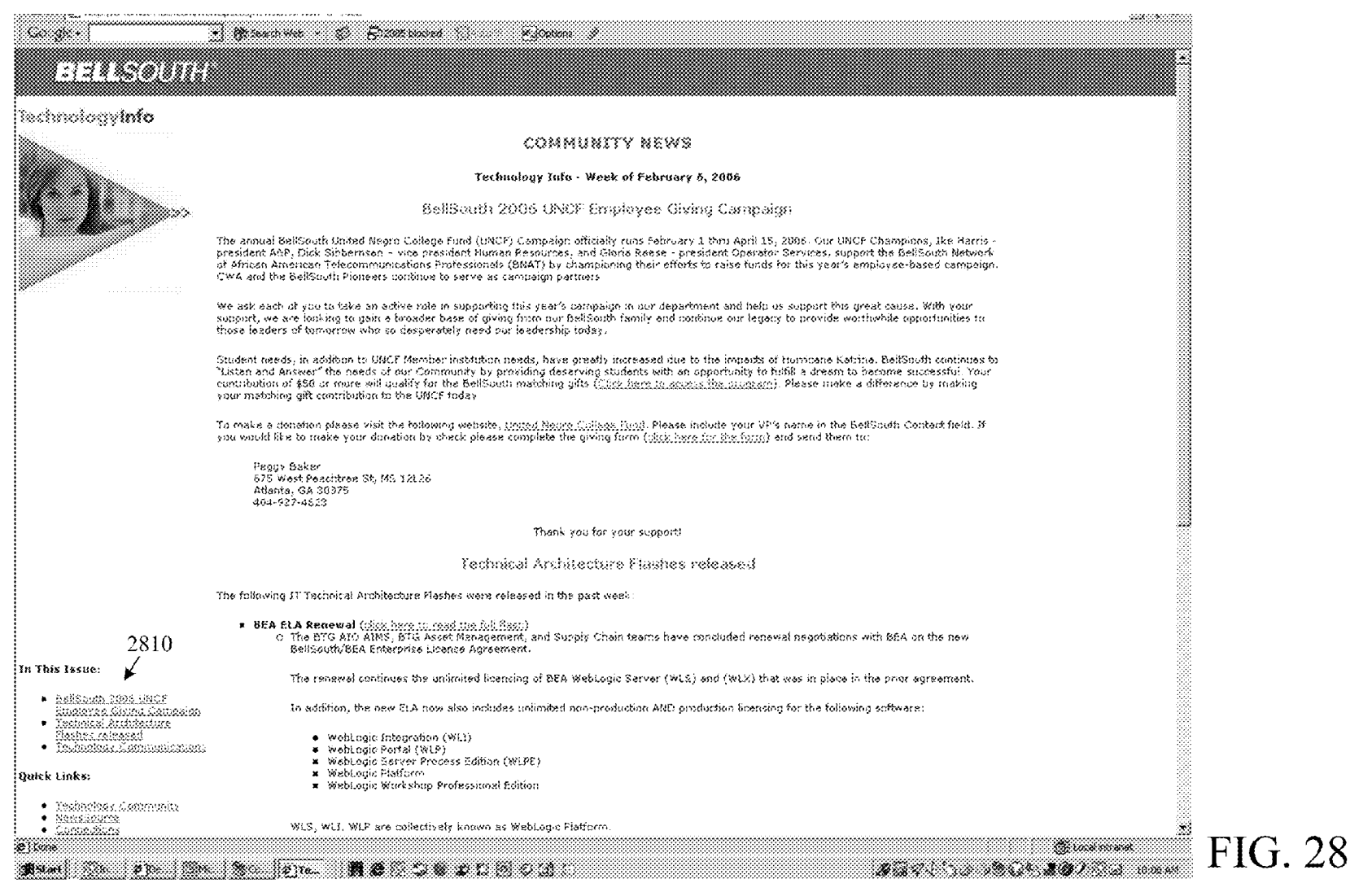

Selection of the See Formatted View link 2650 in FIG. 26 causes an HTML formatted view of the newsletter to be displayed, as shown in FIG. 28. Within this document, key links 2810 into main topics of that newsletter may be provided. Also, the formatted view may be emailed to others.

Thus, one embodiment of the workspace site provides abilities to create a collection of articles into a newsletter; to delete existing newsletters; to archive existing newsletters; to view a newsletter in an HTML view with a common layout design and graphics applied; to re-order newsletters; and to re-order articles in a newsletter. Further, some embodiments provide the ability to select a primary image for a newsletter and the ability to publish and consume newsletter articles into other sites (e.g., XML (eXtensible Markup Language) Feed).

Figure 29:
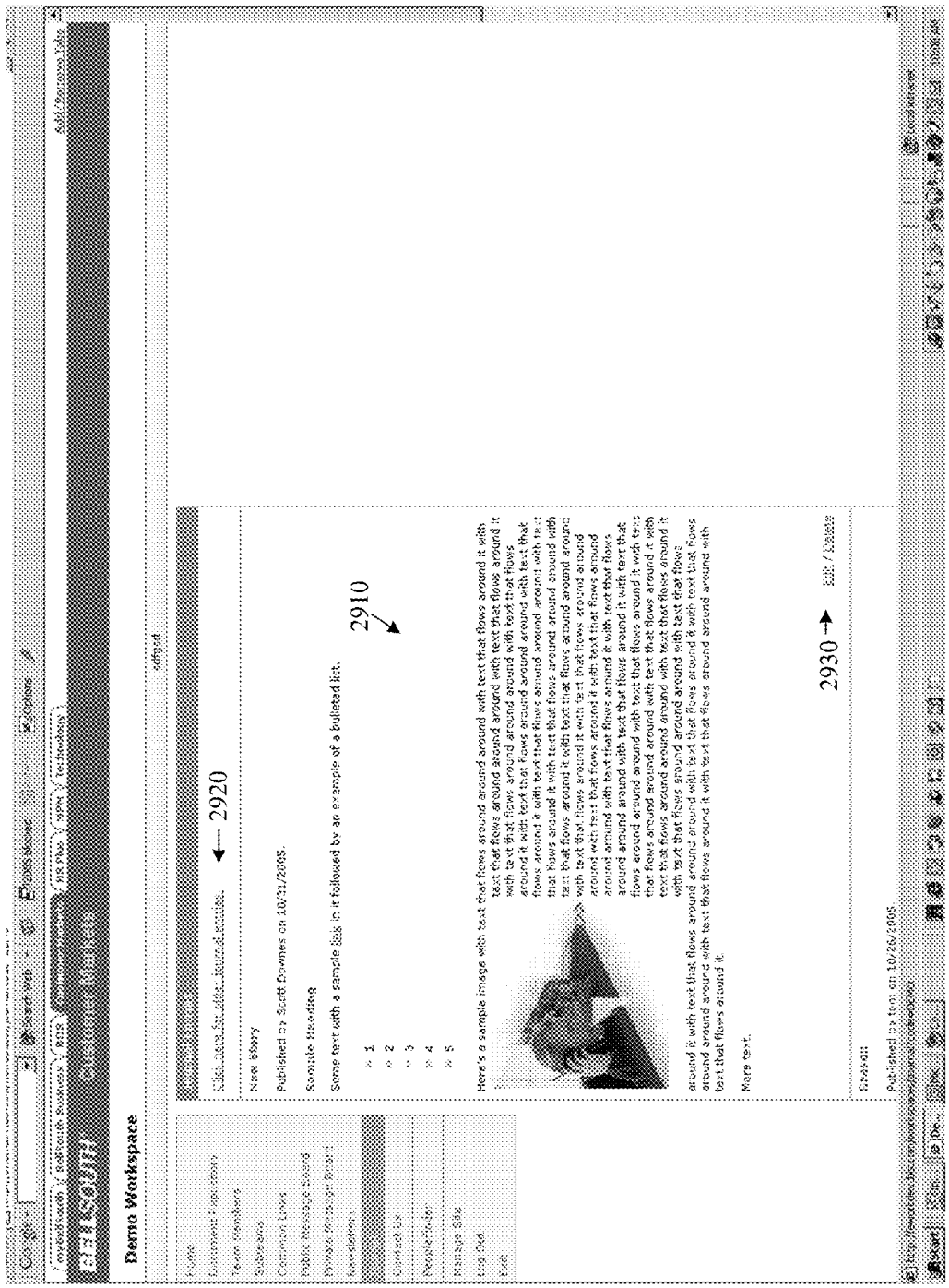

Journal functionality is similar to the newsletters and may be accessed by selecting the Journal link 2720 on the navigation pane 2730, in some embodiments. As shown in FIG. 29, a web page for journals displays a most recent journal entry 2910 and also provides a link 2920 to access older journal entries. For users that have sufficient privilege, tools 2930 are provided to edit or delete journal content.

Figure 30:
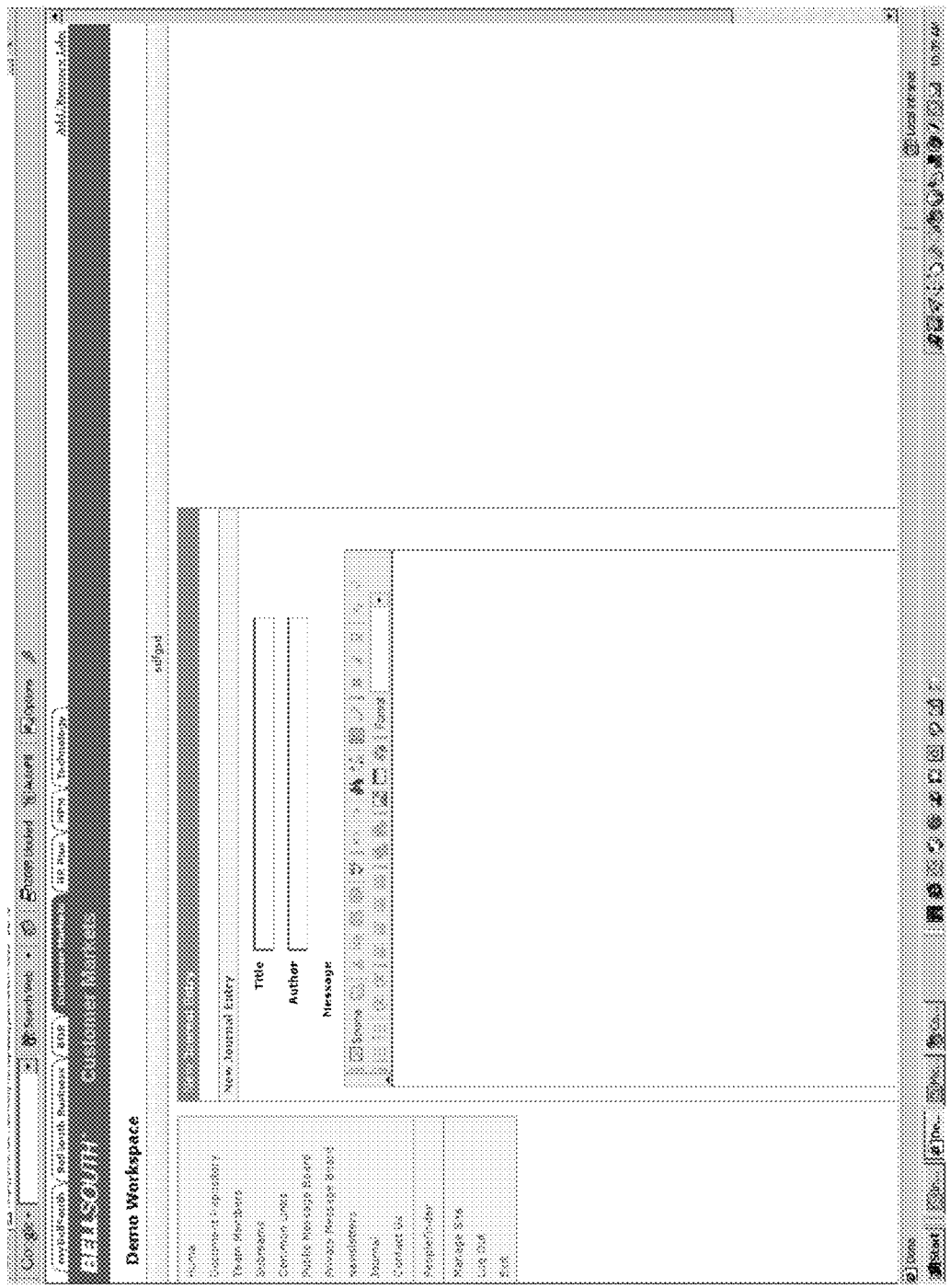
Figure 31:
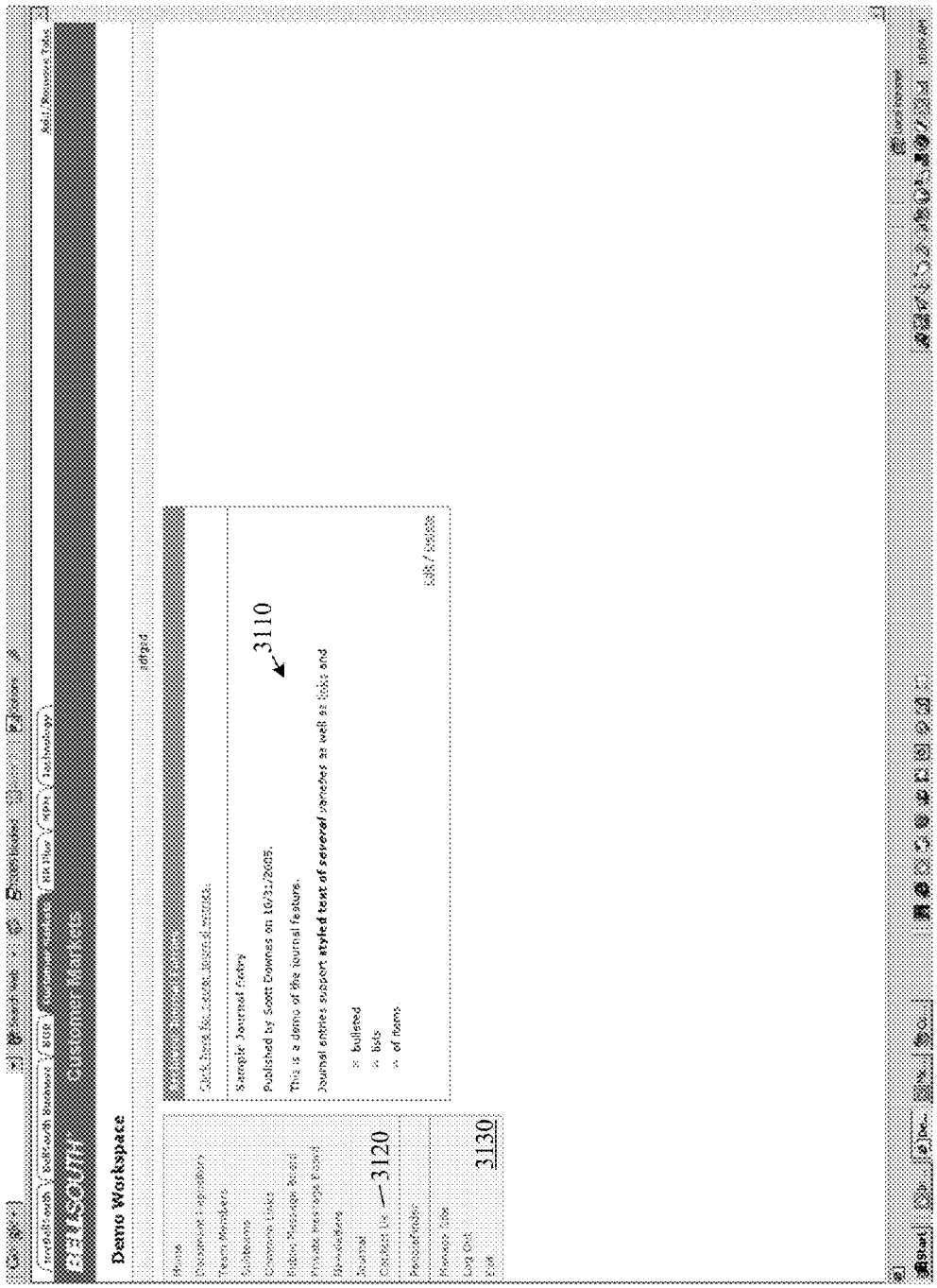

In some embodiments, a full HTML editor may be provided to create a new journal entry, as shown in FIG. 30. A "Sample Journal Entry" 3110 is shown in FIG. 31.

In one embodiment, a workspace site can be configured to provide abilities that include publishing zero to many articles; displaying journal entry headlines on the home page of the site; creating, editing, deleting and archiving articles; having stylized text in articles (e.g., bold, underline, italicized, hyperlinked); to embed pictures in articles (with/without hyperlinks); embedding tables in articles; having lists within articles; and publishing and consuming journal headlines into other sites (e.g., XML Feed).

Figure 32:
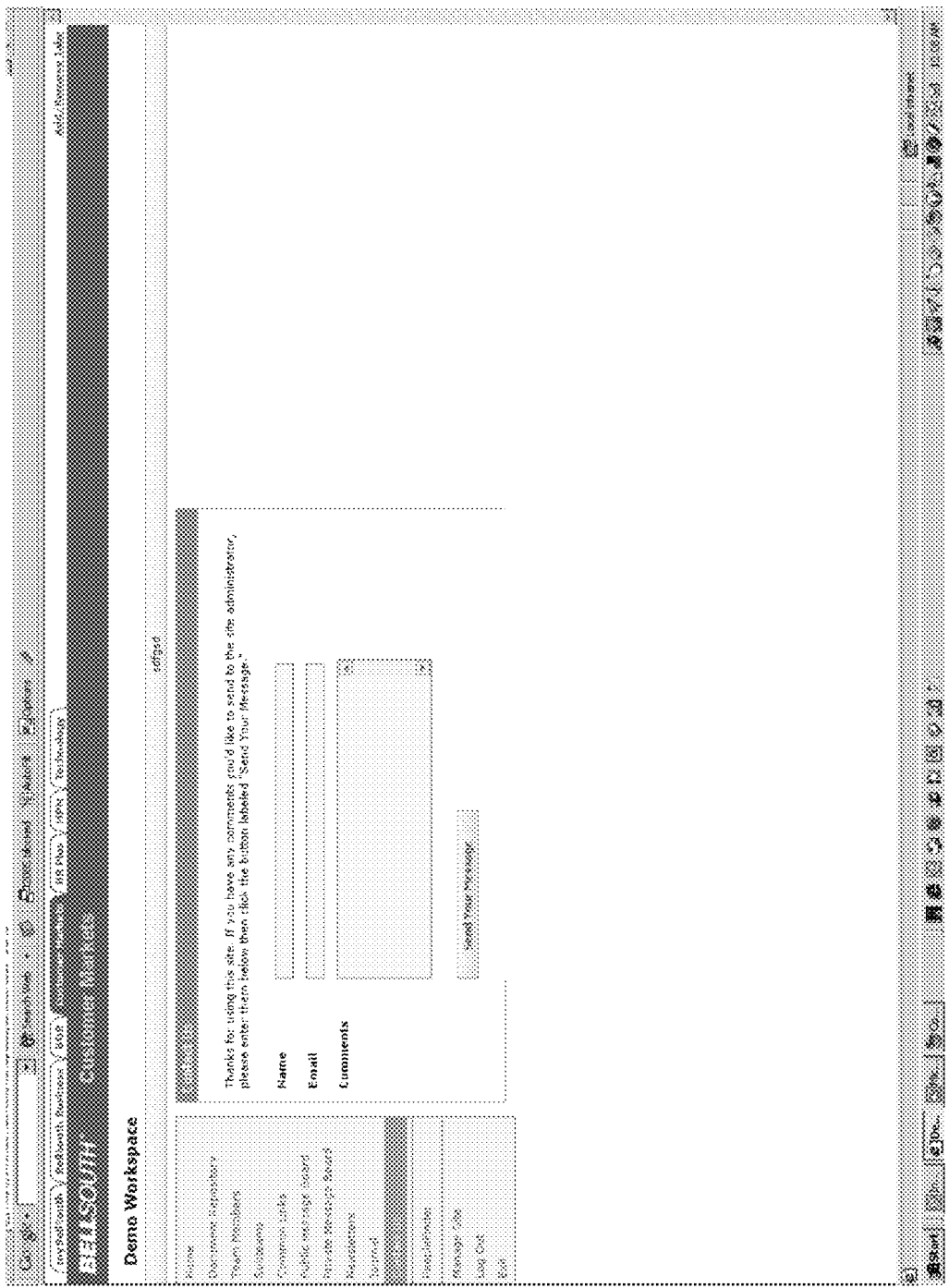

By accessing the Contact Us link 3120 provided on the navigation pane 3130, a user of the site can provide comments for the site administrator or owner. As shown in FIG. 32 (which was retrieved in response to activation of link 3110), a user can fill out a form that uses the email address 960 provided in the Manage Site preferences for the Owner of the site to receive questions or comments from visitors to the site.

Additional functionality may be provided in workspace sites built by the eworkspace application 105. For example, a framework authoring tool of the eworkspace application can enable workspace sites built by the eworkspace application to have the abilities to view a calendar application for a workspace. In one embodiment, the calendar application shows a current month as well as previous/next month, allows users to view events contained on the calendar, and add events to the calendar. Also, the ability to send event notification to an individual or team/subteam is provided by the calendar application which can be integrated with client applications, such as Outlook®.

Also, in some embodiments, a photo album application is able to be provided in workspace sites. Accordingly, abilities to create/delete photo albums; to categorize photo albums; to upload/delete images and reference information; to manage image metadata; to rate images, to comment on images; and to send image as a postcard are provided by one embodiment of the calendar application.

Advantageously, in accordance with one embodiment, workspace sites may be built such that site content may be exposed for other applications to consume. For example, newsletter and journal functionality may be exposed for other applications to consume RSS (Really Simple Syndication) newsfeeds, where the newsfeeds exist in predictable URLs with configurable parameters for the number of stories or articles that are desired to be retrieved.

In this way, other applications can display a workspace's journal entries or newsletter articles in a customized list in an XML format to be programmatically rendered in another application. For example, an external web page can display content, such as articles from a workspace site, by linking to the content to the workspace site.

Accordingly, the workspace site built by the eworkspace application 105 provides integration points so that other applications can subscribe to the information produced within the existing workspace site. Features such as the editable home page option 997 (FIG. 9) allow the workspace site to be an engine behind an application that is developed using other technologies but the information is made available for use to the other application from the workspace site. Accordingly, the workspace site can be used to publish content. Similarly, links to the document repository 1010 on the workspace site can be used to display and manage other content that may be difficult for the operators of an external site to facilitate. By using the collaborative workspace system 100, operators of other applications and web sites can be helped with management of content used by these applications/sites without having advanced HTML skills. In this way, the eworkspace application 105 can be considered an engine for static web sites to provide dynamic functionality by utilizing integration points provided in a workspace site produced by eworkspace application 105.

Figure 33:
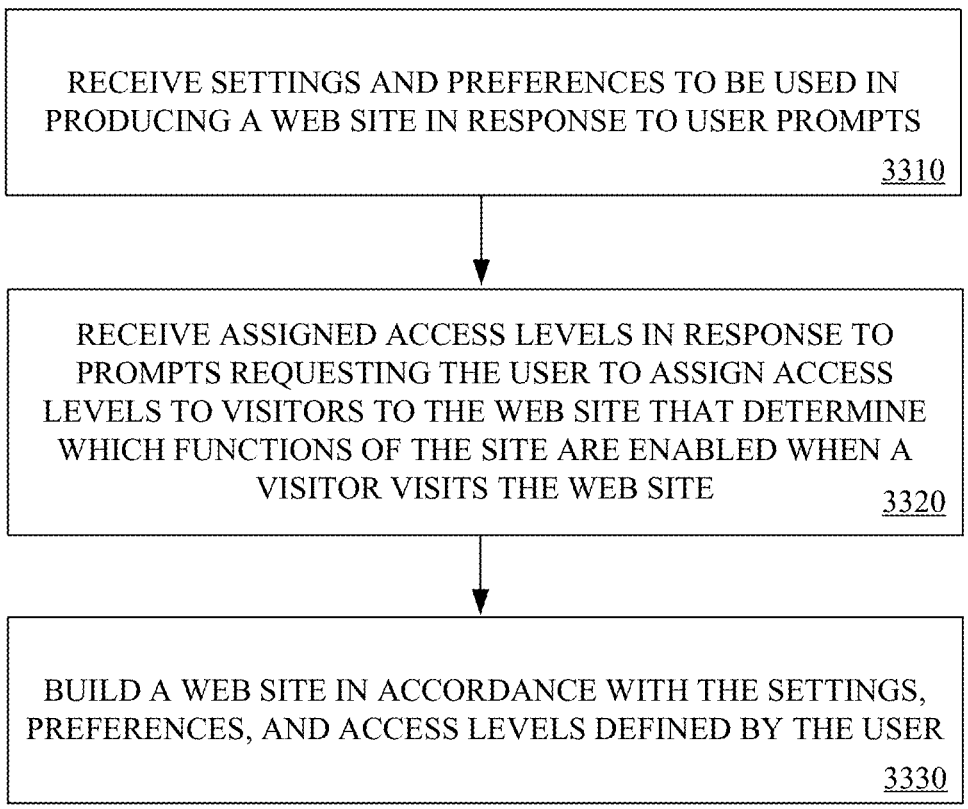
FIG. 33 is a flowchart illustrating the functionality of a representative implementation of one embodiment of the collaborative workspace system of FIG. 1.

The flowchart of FIG. 33 shows the functionality of a representative implementation of one embodiment of the collaborative workspace system. With regard to all flow charts described herein, each block represents a module, segment, or portion of code, which comprises one or more executable instructions for implementing the specified logical function(s). It should also be noted that in some alternate implementations, the functions noted in the blocks may occur out of the order noted. For example, two blocks shown in succession may in fact be executed substantially concurrently, or the blocks may sometimes be executed in the reverse order, depending upon the functionality involved.

In this particular process, settings and preferences to be used in producing a web site for the user are received (3310) in response to user prompts. For example, a user that has been assigned to be a local administrator to a workgroup site may specify such settings and preferences using a web interface to the eworkspace application 105. Also, assigned access levels are received (3320) in response to user prompts requesting the user to assign access levels to visitors to the web site that determine which functions of the site are enabled when a visitor visits the web site. Accordingly, the access levels may be assigned using a web interface to the eworkspace application 105, in some embodiments. As a result, a web site is built (3330) in accordance with the settings, preferences, and access levels defined by the user. In some embodiments, a web page of the web site may be dynamically created after a web server 151 receives a request for the web page by following a framework established by the eworkspace application 105 and customizing the page according to the settings, preferences, and access rights defined by the user.

Figure 34:
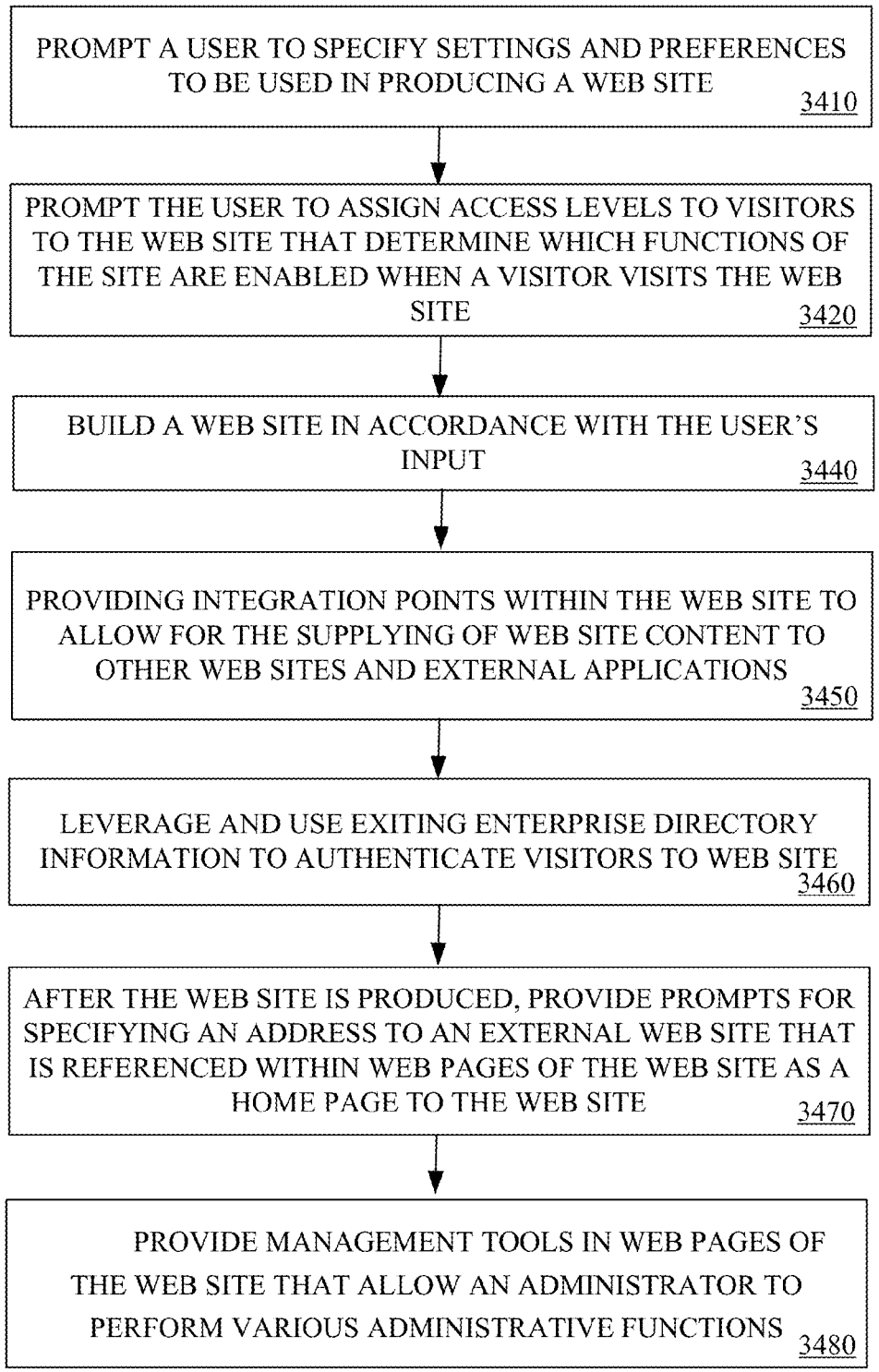
FIG. 34 is a flowchart illustrating one embodiment of a process for facilitating network communications in accordance with the present disclosure.

Next, FIG. 34 is a flowchart illustrating one embodiment of a process for facilitating network communications. As shown by block 3410, a user is prompted to specify settings and preferences to be used in producing a web site. The user uses a web interface to an eworkspace application executed by a server 151 to make the selections. Accordingly, the user is also prompted (3420) to assign access levels to visitors to the web site that determine which functions of the web site are enabled while a visitor is visiting the web site. For example, a particular user may be assigned a role of being a member to the site. Therefore, when the user visits the web site, functions will be enabled for the visitor that have been established for members of the site. Likewise, guests to the site that who are not members to the site may not be allowed to access some features of the site. After the user provides his or her input, a web site is built (3440) in accordance with the user's input. In building the web site, integration points are provided (3450) within the web site to allow for the supplying of web site content to other web sites and external applications (e.g., via RSS feeds). Also, the web site is built such that exiting enterprise directory information is leveraged (3460) and used to authenticate visitors to the web site, amongst other uses. After the web site is produced, prompts are provided within a web page of the site for specifying (3470) an address to an external web site that is referenced within web pages of the web site as a home page to the web site. This is one way in which an external web site can be integrated with the web site built using the present process. Management tools are also provided (3480) in web pages of the web site that allow an administrator to perform various administrative functions, such as assigning users to a team that have different access rights than users that are not assigned to the team or allowing a user with administrative privileges to edit and delete content provided on the web site, amongst others.

Advantageously, embodiments of the present disclosure provide a unique assemblage of functions in a workgroup site produced by the eworkspace application. For example, desktop publishing is provided via a workgroup site that delivers messages in a variety of ways. Syndication of data and integration with existing web sites is also provided along more than one distribution channel of a workgroup site. Integration with enterprise systems and enterprise directory systems is provided.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

Therefore, having thus described the invention, at least the following is claimed:

1. A system for facilitating network communications, comprising:

a memory that stores a program containing code for facilitating network communications; and a processor being responsive to computer-executable instructions contained in the program that, when executed by the processor, cause the processor to perform operations comprising:
creating web pages for a web site in accordance with input received from a user of a plurality of users associated with a project, wherein the web site facilitates the network communications between the plurality of users associated with the project,
receiving selections of features which are available to be added to the web site in response to user prompts and setting access rights on which of the features are to be available to different roles of the plurality of users,
receiving a first request to enable a plurality of capabilities for the web site,
in response to receiving the first request, creating a newsletter web page for the web site providing a collection of newsletters relevant to the project,
providing, to the plurality of users associated with a particular access privilege, options to add a newsletter to the collection of newsletters, delete a newsletter from the collection of newsletters, and modify a newsletter of the collection of newsletters,
receiving a second request to associate a design scheme for the web site,
in response to receiving the second request, associating the web pages of the web site with the design scheme,
receiving a third request to create a survey for the web site;
in response to receiving the third request, prompting for a survey question for association with the survey, and
providing a public statement option to receive input and a private statement option to receive input, wherein input received in the public statement option is viewable via a web page of the web pages by any of the plurality of users, and input received in the private statement option is viewable via a web page of the web pages by users of the plurality of users determined to be authenticated as members registered in an enterprise directory, wherein the enterprise directory comprises the plurality of users associated with the project.

2. The system of claim 1, wherein the web site provides integration points for supplying information to external applications.

3. The system of claim 1, wherein the processor is responsive to further computer-executable instructions contained in the program that, when executed by the processor, cause the processor to perform operations comprising receiving a home page address that is to be provided as a link on the web pages of the web site.

4. The system of claim 1, wherein the different roles of the plurality of users comprise guests, members, and an administrator.

5. The system of claim 1, wherein the web site is designed to access an enterprise directory populated with information of the plurality of users of the web site.

6. The system of claim 1, wherein the web site provides management tools for enabling the user to configure the features of the web site and set the access rights after the web site is initially produced.

7. The system of claim 2, wherein the integration points comprise an RSS feed.

8. A method for facilitating network communications, comprising:
receiving, at a processor, settings and preferences for producing web pages of a web site, wherein the web site facilitates the network communications between a plurality of users associated with a project;
receiving, at the processor, selections of features which are available to be added to the web site in response to user prompts and setting access rights on which of the features are to be available to different roles of the plurality of users;
receiving, at the processor, a first request to enable a plurality of capabilities for the web site;
in response to receiving the first request, creating, by the processor, a newsletter web page for the web site providing a collection of newsletters relevant to the project;
providing, by the processor to the plurality of users associated with a particular access privilege, options to add a newsletter to the collection of newsletters, delete a newsletter from the collection of newsletters, and modify a newsletter of the collection of newsletters;
receiving, by the processor, a second request to associate a design scheme for the web site;
in response to receiving the second request, associating, by the processor, the web pages of the web site with the design scheme;
receiving, at the processor, a third request to create a survey for the web site;
in response to receiving the third request, prompting, by the processor, for a survey question for association with the survey; and
providing, by the processor, a public statement option to receive input and a private statement option to receive input, wherein input received in the public statement option is viewable via a web page of the web pages by any of the plurality of users, and input received in the private statement option is viewable via a web page of the web pages by users of the plurality of users determined to be authenticated as members registered in an enterprise directory, wherein the enterprise directory comprises the plurality of users associated with the project.

9. The method of claim 8, further comprising:
enabling differing views of the web site based on an access level assignment assigned to each of the plurality of users.

10. The method of claim 8, further comprising:
providing management tools in the web site that allow an administrator to the web site to assign a first portion of the plurality of users to a team that have different access rights than a second portion of the plurality of users that are not assigned to the team.

11. The method of claim 8, further comprising:
leveraging information of the enterprise directory to authenticate the plurality of users to the web site.

12. The method of claim 8, further comprising:
providing integration points within the web site for supplying web site content to other web sites and external applications.

13. The method of claim 8, further comprising:
receiving an address to an external web site that is referenced within the web pages of the web site as a home page to the web site.

14. The method of claim 9, further comprising:
assigning a user of the plurality of users with the access level assignment associated with administrative privileges; and
enabling management tools to be displayed for the user, the management tools allowing the user to edit and delete content provided on the web site.

15. The method of claim 9, wherein the settings, the preferences, and the access level assignment are user-specified.

16. A computer readable storage device storing a computer program that, when executed by a processor, causes the processor to perform operations comprising:

receiving settings and preferences for creating a web site, wherein the web site facilitates the network communications between a plurality of users associated with a project;

receiving selections of features which are available to be added to the web site in response to user prompts and setting access rights on which of the features are to be available to different roles of the plurality of users;

receiving a first request to enable a plurality of capabilities for the web site;

in response to receiving the first request, creating a newsletter web page for the web site providing a collection of newsletters relevant to the project;

providing, to the plurality of users associated with a particular access privilege, options to add a newsletter to the collection of newsletters, delete a newsletter from the collection of newsletters, and modify a newsletter of the collection of newsletters;

receiving a second request to associate a design scheme for the web site;

in response to receiving the second request, associating the web pages of the web site with the design scheme;

receiving a third request to create a survey for the web site;

in response to receiving the third request, prompting for a survey question for association with the survey; and providing a public statement option to receive input and a private statement option to receive input, wherein input received in the public statement option is viewable via a web page of the web pages by any of the plurality of users, and input received in the private statement option is viewable via a web page of the web pages by users of the plurality of users determined to be authenticated as members registered in an enterprise directory, wherein the enterprise directory comprises the plurality of users associated with the project.

17. The computer readable storage device of claim 16, storing a computer program that, when executed by the processor, causes the processor to perform further operations comprising:

assigning a user of the plurality of users with an access level assignment associated with administrative privileges; and enabling management tools to be displayed for the user, the management tools allowing the user to edit and delete content provided on the web site.

18. The computer readable storage device of claim 16, storing a computer program that, when executed by the processor, causes the processor to perform further operations comprising:

providing management tools in the web site that allow an administrator to the web site to assign a first portion of the plurality of users to a team that have different access rights than a second portion of the plurality of users that are not assigned to the team.

19. The computer readable storage device of claim 16, storing a computer program that, when executed by the processor, causes the processor to perform further operations comprising:

leveraging information of the enterprise directory to authenticate the plurality of users to the web site.

20. The computer readable storage device of claim 17, wherein the settings, preferences, and access level assignment are user-specified.

* * * * *